(12) United States Patent
Tomita et al.

(10) Patent No.: US 8,780,879 B2
(45) Date of Patent: Jul. 15, 2014

(54) FREQUENCY BAND ADJUSTING METHOD, COMMUNICATION APPARATUS AND FREQUENCY BAND ADJUSTING APPARATUS

(75) Inventors: Tetsuo Tomita, Setagaya (JP); Bun Kimura, Yokohama (JP)

(73) Assignee: Fujitsu Limited, Kawasaki (JP)

(*) Notice: Subject to any disclaimer, the term of this patent is extended or adjusted under 35 U.S.C. 154(b) by 61 days.

(21) Appl. No.: 13/567,204

(22) Filed: Aug. 6, 2012

(65) Prior Publication Data

US 2012/0294300 A1 Nov. 22, 2012

Related U.S. Application Data

(63) Continuation of application No. PCT/JP2010/051618, filed on Feb. 4, 2010.

(51) Int. Cl.
*H04J 1/00* (2006.01)
(52) U.S. Cl.
USPC .......................................................... 370/344
(58) Field of Classification Search
USPC ................... 370/344, 343, 310, 331
See application file for complete search history.

(56) References Cited

U.S. PATENT DOCUMENTS

| 6,456,849 | B1* | 9/2002 | Purnadi et al. ................ 455/453 |
|---|---|---|---|
| 6,650,655 | B2 | 11/2003 | Alvesalo et al. |
| 7,729,666 | B2 | 6/2010 | Zhang et al. |
| 2002/0186710 | A1* | 12/2002 | Alvesalo et al. ............. 370/468 |
| 2007/0291640 | A1 | 12/2007 | Zhang et al. |
| 2008/0200195 | A1 | 8/2008 | Abe et al. |
| 2010/0240369 | A1* | 9/2010 | Law et al. ..................... 455/436 |

FOREIGN PATENT DOCUMENTS

| JP | 2001-518766 | 10/2001 |
|---|---|---|
| JP | 2003-333648 | 11/2003 |
| JP | 2005-210703 | 8/2005 |
| JP | 2007-184933 | 7/2007 |
| JP | 2007-259041 | 10/2007 |
| JP | 2008-278265 | 11/2008 |
| WO | 2005/117473 | 12/2005 |

OTHER PUBLICATIONS

Notice of Reasons for Rejection dated Sep. 10, 2013, from corresponding Japanese Application No. 2011-552616.
International Search Report dated Mar. 23, 2010, from corresponding Japanese Application No. PCT/JP2010/051618.
Tsuyoshi Yamada, et al. "An Effective Spectrum Sharing Method for WiMAX/WLAN Integrated Network Using Cognitive Radio Technology" IEICE Technical Report, Feb. 28, 2008, pp. 325-328.

* cited by examiner

*Primary Examiner* — Andrew Lai
*Assistant Examiner* — Zhiren Qin
(74) *Attorney, Agent, or Firm* — Katten Muchin Rosenman LLP

(57) ABSTRACT

A frequency band adjusting method, in a first communication system and a second communication system sharing usable frequency band with each other, for adjusting the frequency band used by a first communication apparatus in the first communication system, comprising: determining whether or not increase in the frequency band used by the first communication apparatus is necessary based on the frequency band used by the first communication apparatus and the number of access to the first communication apparatus; determining whether or not increase in the frequency band used by the first communication apparatus is to be approved, according as there is or there is not unused frequency band not used by a second communication apparatus in the second communication system having coverage overlapping with the first communication apparatus; and, if increase is approved, increasing the frequency band used by the first communication apparatus.

15 Claims, 21 Drawing Sheets

FREQUENCY BAND ADJUSTING METHOD, COMMUNICATION APPARATUS AND FREQUENCY BAND ADJUSTING APPARATUS

CROSS-REFERENCE TO RELATED APPLICATIONS

This application is a continuation application based on International application No. PCT/JP2010/051618, filed on Feb. 4, 2010, the entire contents of which are incorporated herein by reference.

FIELD

Embodiments described in the present specification relate to a method of adjusting a frequency band used in a communication system, and to a communication apparatus and a frequency band adjusting apparatus.

BACKGROUND

In recent years, various radio communication systems are being used in parallel. Examples of radio communication systems presently in service include a $3^{rd}$ generation mobile communication system, $3.5^{th}$ generation mobile communication system, $3.9^{th}$ generation mobile communication system, Wi-Fi (Wireless Fidelity), and Wi-MAX (World Interoperability Microwave), etc.

A radio communication control method has been proposed which can improve overall throughput of radio communication traffic in a radio communication area in a radio communication environment where plural types of radio communication systems are mixedly used in a neighboring radio communication area. When a multi-mode control station communicates with a terminal station in a network through plural types of communication systems, a communication link parameter collecting unit collects parameters indicating the state of communication links, and a resource allocation determining unit determines allocation of communication resources such that throughput is the greatest for each resource allocation period based on the parameters. A communication control unit controls the multi-mode communication unit based on the result of this determination.

Also, a dynamic spatial frequency division multiplex communication system has been proposed which includes a base station that acquires control information for a space/frequency mapping system to map user terminals on a space and frequency by executing optimization calculation utilizing an optimization equation, and a plurality of user terminals which, after receiving the control information, use this information to control the transmission system of the transmitter. In this system, resource allocation between different users may be balanced in each region of transmission power, band width and a spatial channel so that a high system capacity can be achieved and utilization factor of frequency resource can be improved.

Also, a radio communication system has been proposed in which frequency can be dynamically arranged to a plurality of radio communication systems which use the same frequency band. The control unit uses a part of the frequency band in overlapping manner with other radio communication systems. A plurality of base stations controlled by the control unit are provided with repetition utilization cell number determining means, which assign individual frequency channels to each divided band obtained by dividing the assigned frequency band of its own radio communication system, and based on the utilization state of the frequency band assigned to at least one other radio communication system, determine the frequency repetition utilization cell number that indicates number of repetition utilization of a frequency channel which is assigned to each divided band, and frequency band determining means that determine the divided band to be assigned to each of the base stations based on the number of frequency repetition utilization cells.

Also, a mobile communication system has been proposed which is capable of improving the efficiency of frequency utilization by adaptively allocating radio resources such as a frequency block, a time slot, a code or a combination of them to a plurality of cells. A mobile communication system is provided with a plurality of base station apparatuses which provide communication services to mobile station apparatuses. A mobile communication system includes means for acquiring information on the utilization state of the radio resources of the peripheral base station apparatus through the mobile station apparatuses existing near the peripheral base station apparatus, and means for preventing the radio resources being currently used in the peripheral base station apparatus from being used in a focused base station apparatus or making it difficult to allocate user data to the radio resources of the focused base station apparatus on the basis of the acquired information.

Related art is disclosed in WO 2005/117473 pamphlet, and Japanese Laid-open Patent Publications No. 2007-184933, No. 2005-210703 and No. 2008-278265.

SUMMARY

According to an aspect of the embodiments, a frequency band adjusting method which, in a first communication system and a second communication system sharing a frequency band with each other, adjusts the frequency band used in a first communication apparatus in the first communication system is provided. This method includes determining necessity of increase of the frequency band used by the first communication apparatus based on the frequency band used by the first communication apparatus and the number of access to the first communication apparatus, determining, if there is necessity of increase in the frequency band used by the first communication apparatus, whether or not an increase of the frequency band used by the first communication apparatus is to be approved, according as there is or there is not unused frequency band not used by a second communication apparatus in the second communication system having coverage overlapping with the first communication apparatus, and increasing the frequency band used by the first communication apparatus, if it is determined that an increase in the frequency band used by the first communication apparatus is to be approved.

According to another aspect of the embodiments, in a first communication system and a second communication system sharing a usable frequency band with each other, a first communication apparatus used in the first communication system is provided. The first communication apparatus includes a band increase necessity determining unit that determines necessity of the frequency band used by the first communication apparatus based on the frequency band used by the first communication apparatus and the number of access to the first communication apparatus, a band increase request transmission unit that transmits a request signal requesting increase of the frequency band used by the first communication apparatus to a second communication apparatus in the second communication system having coverage overlapping with the first communication apparatus, if it is determined in the determination by the band to increase the necessity determining unit that there is necessity of increase in the frequency band used by the first communication apparatus, and a band increasing unit that increases the frequency band used by the first communication apparatus if an approval signal in response to the request signal is received from the second communication apparatus.

According to still another aspect of the embodiments, in a first communication system and a second communication system sharing a usable frequency band with each other, a second communication apparatus used in the second communication system is provided. The second communication apparatus includes a band increase request receiving unit that receives, from a first communication apparatus in the first communication system that has coverage overlapping with the second communication apparatus, a request signal requesting increase of the frequency band used by the first communication apparatus, a band increase approval determining unit that determines, according as there is or there is not unused frequency band not used by the second communication apparatus, whether or not increase of the frequency band used by the first communication apparatus is to be approved, and an approval signal transmission unit that transmits, if it is determined in the determination by the band increase approval determining unit that increase of the frequency band used by the first communication apparatus is to be approved, an approval signal approving increase of the frequency band used by the first communication apparatus to the first communication apparatus.

According to still another aspect of the embodiments, in a first communication system and a second communication system sharing a usable frequency band with each other, a first frequency band adjusting apparatus for adjusting the frequency band used by a first communication apparatus in the first communication system is provided. The first frequency band adjusting apparatus includes a band increase necessity determining unit that determines necessity of increase of the frequency band used by the first communication apparatus based on the frequency band used by the first communication apparatus and the number of access to the first communication apparatus, a band increase request transmission unit that transmits a request signal requesting increase of the frequency band used by the first communication apparatus to a second frequency band adjusting apparatus for adjusting the frequency band used by a second communication apparatus in the second communication system having coverage overlapping with the first communication apparatus, if it is determined in the determination by the band increase necessity determining unit that there is necessity of increase in the frequency band used by the first communication apparatus, and an increase instructing unit that instructs increase of the frequency band used to the first communication apparatus, if an approval signal is received from the second frequency band adjusting apparatus in response to the request signal.

According to still another aspect of the embodiments, in a first communication system and a second communication system sharing a usable frequency band with each other, a second frequency band adjusting apparatus for adjusting the frequency band used by a second communication apparatus in the second communication system is provided. The second frequency band adjusting apparatus includes a band increase request receiving unit that receives a request signal requesting increase of the frequency band used by a first communication apparatus from a first frequency band adjusting apparatus for adjusting the frequency band used by the first communication apparatus in the first communication system having coverage overlapping with the second communication apparatus, a band increase approval determining unit that determines whether or not increase of the frequency band used by the first communication apparatus is to be approved according as there is or there is not unused frequency band not used by the second communication apparatus, and an approval signal transmission unit that transmits an approval signal for approving increase of the frequency band used by the first communication apparatus to the first band adjusting apparatus, if, in the determination by the band increase approval determining unit, it is determined that increase of the frequency band used by the first communication apparatus is to be approved.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Conventionally, a radio frequency band is fixedly allocated to each radio communication system used in parallel. However, since radio communication has become more and more diversified in recent years, it is difficult to use such conventional method to allocate radio frequency band efficiently to these radio communication systems.

It is an object of the apparatus and method of the embodiments to improve utilization efficiency of radio frequency band allocated to a plurality of communication systems used in parallel.

Figure 1:
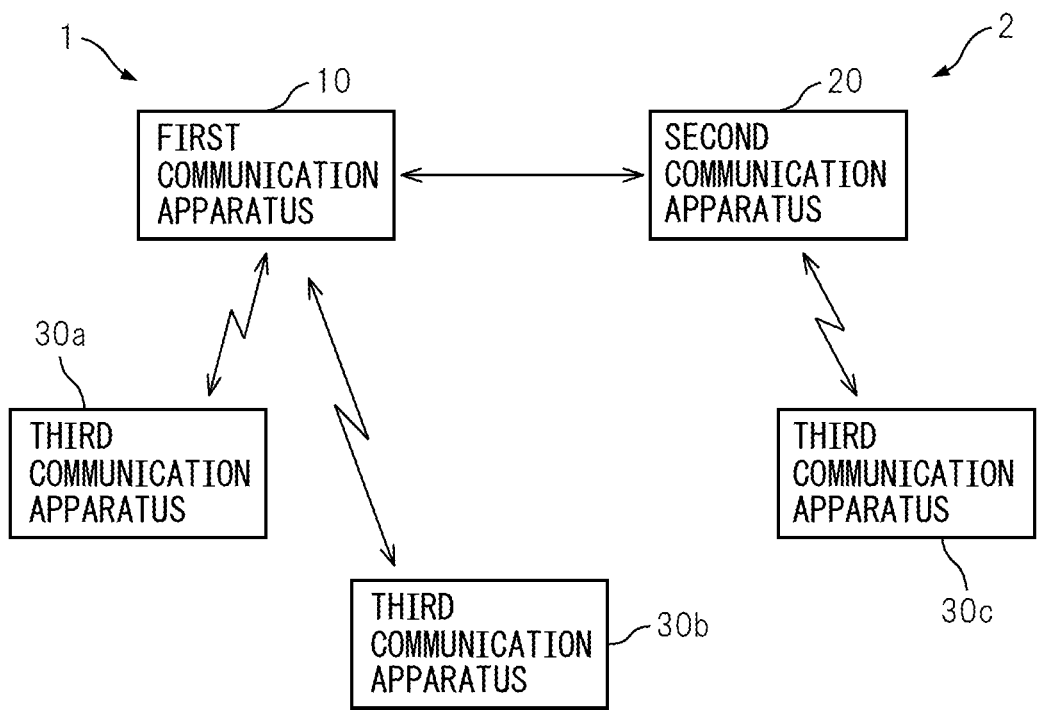
FIG. 1 is a diagram depicting a first exemplary construction of a communication system.

Preferred embodiments will be described below with reference to appended drawings. FIG. 1 is a diagram depicting a first exemplary construction of communication systems. A first communication system 1 includes a first communication apparatus 10. A second communication system 2 includes a second communication apparatus 20. The first communication apparatus 10 in the first communication system 1 performs radio communication with third communication apparatuses 30a and 30b. The second communication apparatus 20 in the second communication system 2 performs radio communication with a third communication apparatus 30c. The third communication apparatuses 30a to 30c may be used both in the first communication system 1 and the second communication system 2. In the description that follows, the third communication apparatuses 30a to 30c may be collectively denoted as "third communication apparatus 30".

The first communication system 1 and the second communication system 2 share a radio frequency band usable for radio communication with the third communication apparatus 30. Thus, the radio frequency band functionally usable in the first communication system 1 and the radio frequency band functionally usable in the second communication system 2 overlap partially or totally with each other. In the description that follows, a radio frequency band may be denoted simply as "frequency band".

Figure 2:
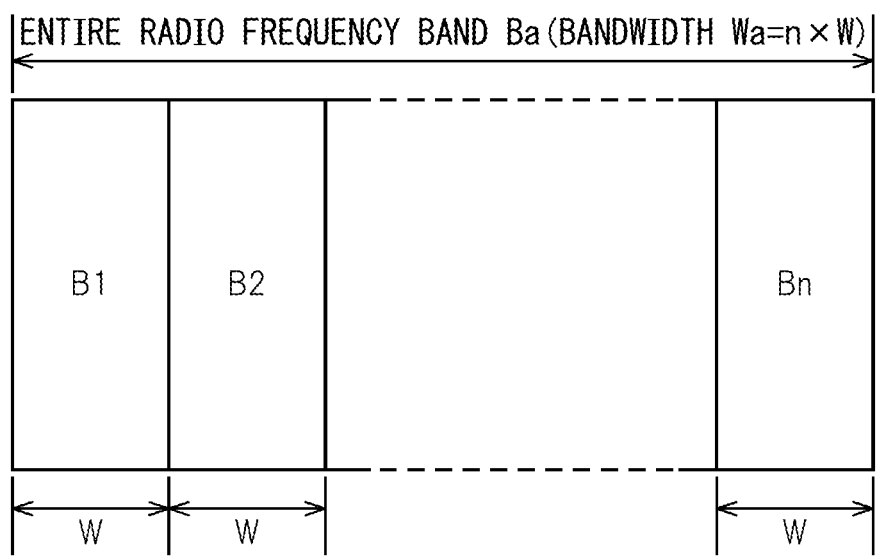
FIG. 2 is a diagram illustrating the frequency band usable in each communication system.

FIG. 2 is a diagram illustrating the frequency band usable in each of the communication systems 1 and 2. The entire frequency band shared by the first communication systems 1 and the second communication systems 2 as usable frequency band is denoted as "Ba". The entire frequency band Ba is divided into a plurality of unit frequency bands B1 to Bn. Bandwidth of each frequency band B1 to Bn may be, for example, "W". Then, bandwidth of the entire frequency band Ba is Wa=n×W. The bandwidth of each frequency band B1 to Bn may not be same.

For example, the first communication system 1 and the second communication system 2 may be a $3.5^{th}$ generation mobile communication system or a $3.9^{th}$ generation mobile communication system. Then, the bandwidth Wa of the entire frequency band Ba may be, for example, 20 MHz. The entire frequency band Ba may be divided in 4 unit frequency band B1 to B4. The bandwidth of each frequency band B1 to B4 may be each 5 MHz.

Referring to FIG. 1, a case is considered wherein the coverage of the first communication apparatus 10 and the coverage of the second communication apparatus 20 overlap each other. Then, if the first communication system 1 and the second communication system 2 actually use the same frequency band, interference may be produced between these communication systems. Therefore, the first communication apparatus 10 and the second communication apparatus 20 dynamically adjust the frequency band used so as not to use the same frequency band.

Figure 3:
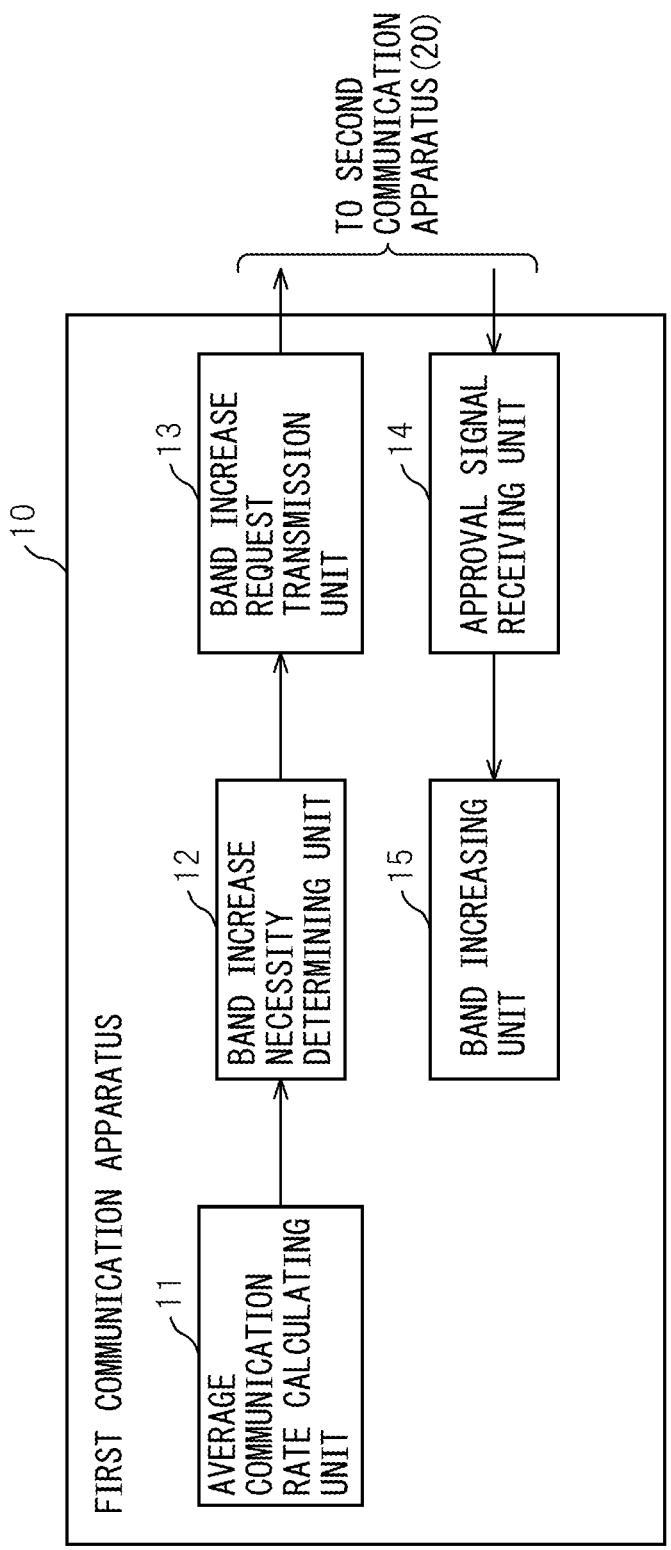
FIG. 3 is a diagram depicting a first exemplary construction of a first communication apparatus.

FIG. 3 is a diagram depicting a first exemplary construction of the first communication apparatus 10. The first communication apparatus 10 includes an average communication rate calculating unit 11, a band increase necessity determining unit 12, a band increase request transmission unit 13, an approval signal receiving unit 14 and a band increasing unit 15.

The average rate calculating unit 11 calculates the average communication rate per access va based on the frequency band used by the first communication apparatus 10 and the number of access to the first communication apparatus 10. Total communication rate that can be used by all the access to the first communication apparatus 10 is determined by the frequency band used by the first communication apparatus 10 and the nominal rate of the first communication system 1. For example, if the bandwidth of the frequency band used by the first communication apparatus 10 is 5 MHz, and the first communication system 1 is a $3.5^{th}$ generation mobile communication system, total communication rate of the downlink is 14 Mbps. Also, if, for example, the bandwidth of the frequency band used by the first communication apparatus 10 is 5 MHz, and the first communication system 1 is a $3.9^{th}$ generation mobile communication system, total communication rate is 37.5 Mbps.

The average communication rate calculating unit 11 determines total communication rate of all the access to the first communication apparatus 10, for example, based on the frequency band used by the first communication apparatus 10 and the nominal rate of the first communication system 1. The average communication rate calculating unit 11 calculates the average communication rate per access va by dividing the total communication rate by the current number of access to the first communication apparatus 10.

The band increase necessity determining unit 12 determines whether or not increase of the frequency band used by the first communication apparatus 10 is necessary. For example, the band increase necessity determining unit 12 determines that increase of the frequency band used by the first communication apparatus 10 is necessary, when, for example, the average communication rate va is smaller than a prescribed lower bound threshold T1.

The band increase necessity determining unit 12 may calculate necessary increment for the frequency band used by the first communication apparatus 10. For example, the band increase necessity determining unit 12 may calculate the communication rate difference that is the difference between the lower bound threshold T1 or the value obtained by adding a prescribed margin to this quantity and the average communication rate va. The band increase necessity determining unit 12 may calculate the smallest number of unit frequency bands B1 to Bn that can accommodate the calculated communication rate difference as the necessary increment.

The band increase request transmission unit 13 transmits a request signal requesting increase of the frequency band used by the first communication apparatus 10 to the second communication apparatus 20 if increase of the frequency band used by the first communication apparatus 10 is necessary.

The approval signal receiving unit 14 receives an approval signal from the second communication apparatus 20 in response to the above-described request signal. As will be described later, the approval signal may include information on the increment of the frequency band used by the first communication apparatus 10 approved by the second communication apparatus 20.

The band increasing unit 15 increases the frequency band used by the first communication apparatus 10 when the approval signal is received from the second communication apparatus 20. For example, the band increasing unit 15 may increase the frequency band used by the first communication apparatus 10 by one unit frequency band B1 to Bn. For example, when the band increase necessity determining unit 12 calculates the above-described necessary increment, the band increasing unit 15 may increase the frequency band used by the first communication apparatus 10 by the calculated increment. Further, for example, when the approval signal includes information on the increment, the band increasing unit 15 may increase the frequency band used by the first communication apparatus 10 by the indicated increment.

Figure 4:
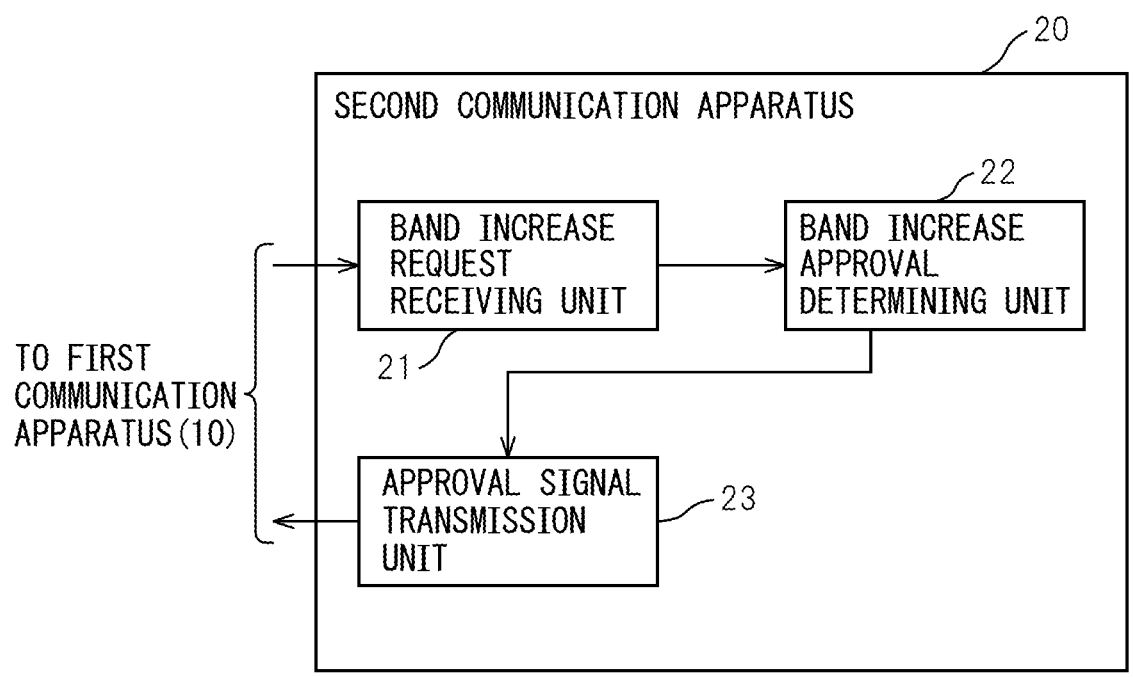
FIG. 4 is a diagram depicting a first exemplary construction of a second communication apparatus.

FIG. 4 is a diagram depicting a first exemplary construction of the second communication apparatus 20. The second communication apparatus 20 includes a band increase request receiving unit 21, a band increase approval determining unit 22, and an approval signal transmission unit 23. The band increase request receiving unit 21 receives a request signal requesting increase of the frequency band used by the first communication apparatus 10 from the first communication apparatus 10.

The band increase approval determining unit 22 determines whether or not increase of the frequency band requested in the request signal is to be approved according as there is or there is not unused frequency band not used by the second communication apparatus 20.

The band increase approval determining unit 22 may approve only a part of requested increase of the frequency band when all of the requested increase of the frequency band cannot be approved. This applies also to other embodiments to be described below. For example, when the request signal includes information on necessary increment of the frequency band used by the first communication apparatus 10, the band increase approval determining unit 22 may approve only a part of the necessary increment of the frequency band used.

The approval signal transmission unit 23 transmits an approval signal approving increase of the frequency band used by the first communication apparatus 10 when increase of the frequency band used by the first communication apparatus is approved. When increase of the frequency band used by the first communication apparatus is not approved, the approval signal transmission unit 23 may transmit disapproval signal indicating disapproval of increase of the frequency band used by the first communication apparatus 10. When the band increase approval determining unit 22 approves only a part of the requested increase of the frequency band, the approval signal may include information on the increment approved.

Figure 5:
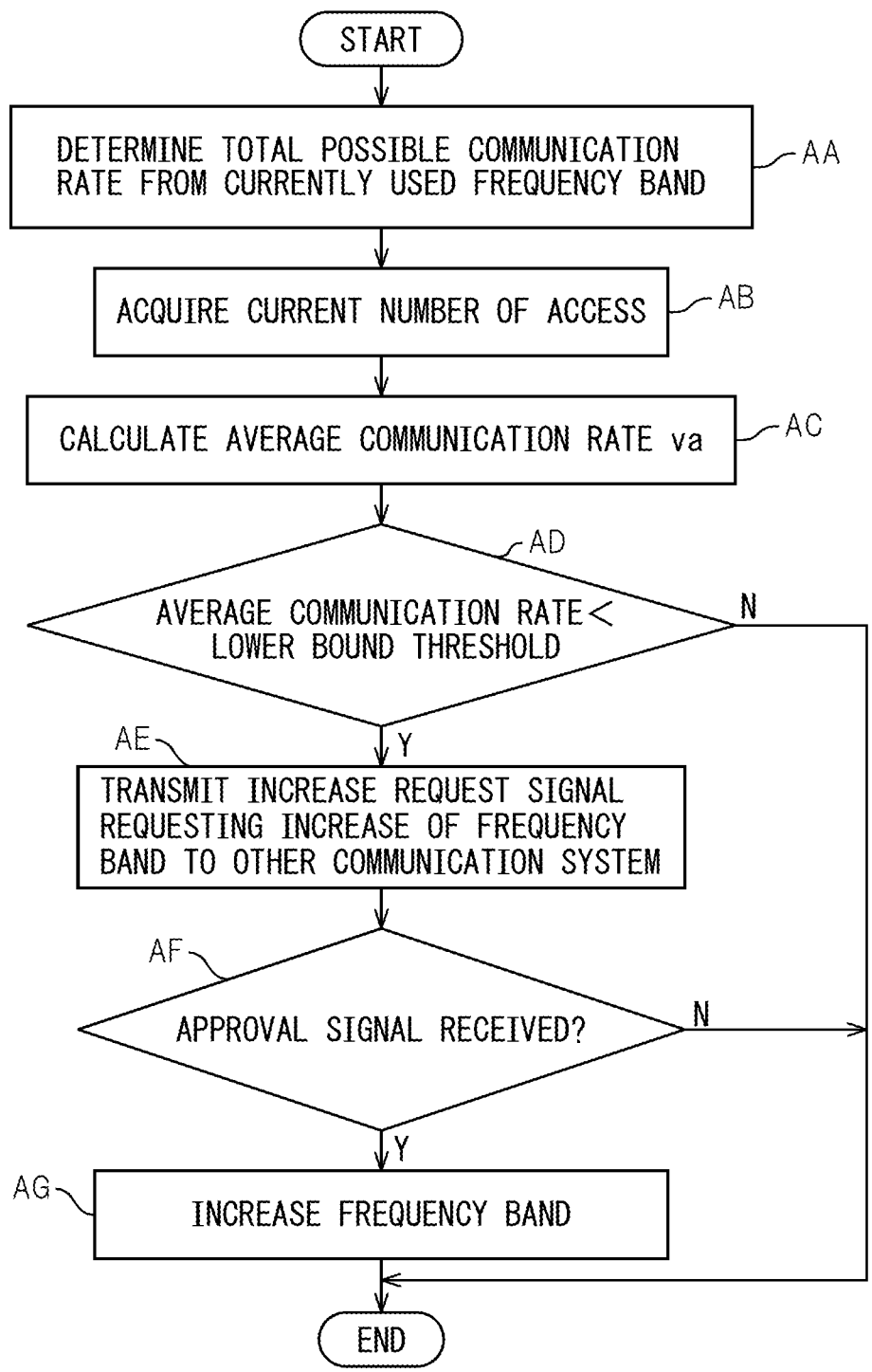
FIG. 5 is a diagram illustrating the processing performed in the first communication apparatus.

FIG. 5 is a diagram illustrating the processing performed in the first communication apparatus 10. Each of the following operations AA to AG may be a step. The first communication apparatus 10 may, for example, periodically execute the operations AA to AG.

In operation AA, the average communication rate calculating unit 11 calculates total communication rate of all access to the first communication apparatus 10 based on the band width of the frequency band being used by the first communication apparatus 10 and the nominal rate of the first communication system 1.

In operation AB, the average communication rate calculating unit 11 acquires the number of current access to the first communication apparatus 10. In operation AC, the average communication rate calculating unit 11 calculates the average communication rate va by dividing the total communication rate of all the access by the number of current access to the first communication apparatus 10.

In operation AD, the band increase necessity determining unit 12 determines whether or not the average communication rate va is smaller than the prescribed lower bound threshold T1. If the average communication rate va is smaller than the prescribed lower bound threshold T1 (operation AD: Y), the processing proceeds to operation AE. If the average communication rate va is not smaller than the prescribed lower bound threshold T1 (operation AD: N), the processing is terminated.

In operation AE, the band increase request transmission unit 13 transmits a request signal requesting increase of the frequency band used by the first communication apparatus 10 to the second communication apparatus 20. In operation AF, the approval signal receiving unit 14 attempts to receive an approval signal transmitted by the second communication apparatus 20 in response to the request signal.

When the approval signal is received (operation AE: Y), the processing proceeds to operation AG. If the approval signal is not received (operation AE: N), the processing is terminated. If the disapproval signal is received, it is the same as the approval signal is not received. In operation AG, the band increasing unit 15 increases the frequency band used by the first communication apparatus 10.

Figure 6:
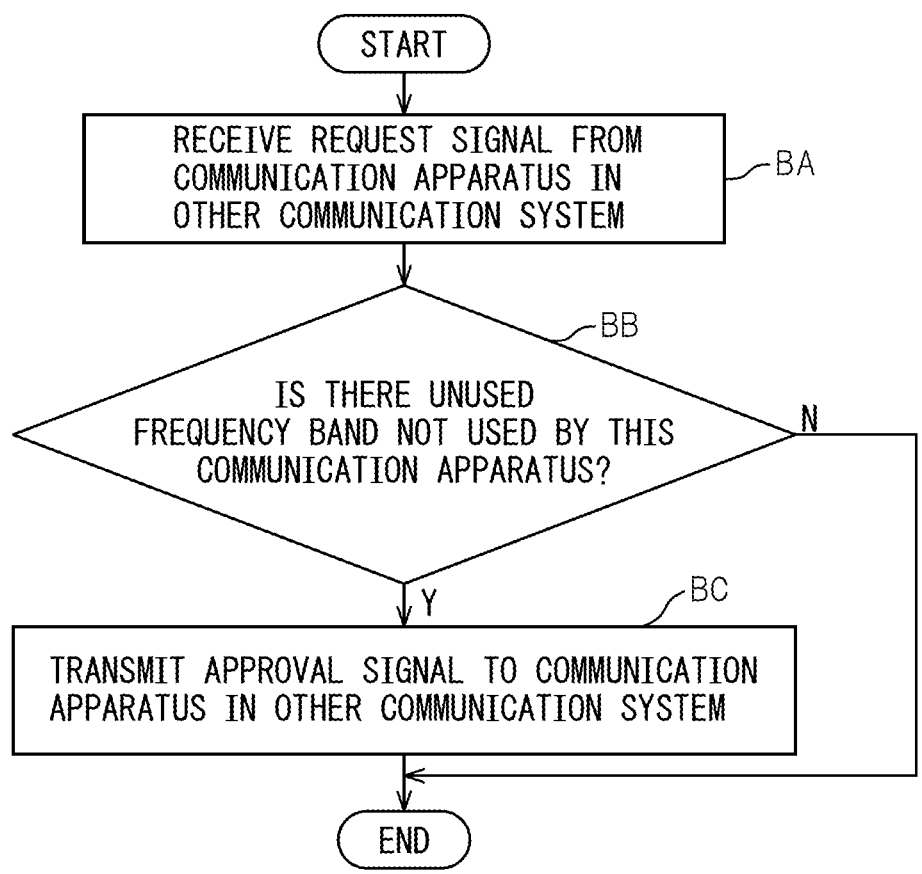
FIG. 6 is a diagram illustrating a first example of the processing performed in the second communication apparatus.

FIG. 6 is a diagram illustrating a first example of the processing performed in the second communication apparatus 20. In other embodiments, each of following operations BA to BC may be a step. The second communication apparatus 20 may execute operations BA to BC, for example, when a request signal is received from the first communication apparatus 10.

In operation BA, the band increase request receiving unit 21 receives a request signal from the first communication apparatus 10. In operation BB, the band increase approval determining unit 22 determines whether or not increase of band requested by the request signal is to be approved according as there is or there is not unused frequency band not used by the second communication apparatus 20 in the entire frequency band Ba.

If there is unused frequency band not used by the second communication apparatus 20 (operation BB: Y), the processing proceeds to operation BC. If there is not unused frequency band not used by the second communication apparatus 20 (operation BB: N), the processing is terminated.

In operation BC, the approval signal transmission unit 23 transmits an approval signal approving increase of the frequency band used by the first communication apparatus 10 to the first communication apparatus 10.

In accordance with the present embodiment, the first communication apparatus 10 can dynamically change the bandwidth of the frequency band used by the first communication apparatus 10 based on the average communication rate va per access to the first communication apparatus 10. In accordance with the present embodiment, frequency band is dynamically added to the communication system for which the average communication rate va is too small, so that utilization efficiency of the frequency band can be improved.

Conventionally, allocation of radio frequency bandwidth to various mobile communication systems is done with reference to the expected access number that will occur in various mobile communication systems. This is because, in conventional mobile communication systems, one radio channel is occupied by one access. Since a mobile communication system is now used in which plural accesses share one radio channel, conventional allocation method based on the expected access number is not appropriate.

Since communication rate is one index of communication quality, it is desirable, when plural accesses share one radio channel, that bandwidth of the radio frequency band is determined with reference to communication rate used for each access. In accordance with the present embodiment, it is possible to allocate the frequency band with reference to the average communication rate per access.

Figure 7:
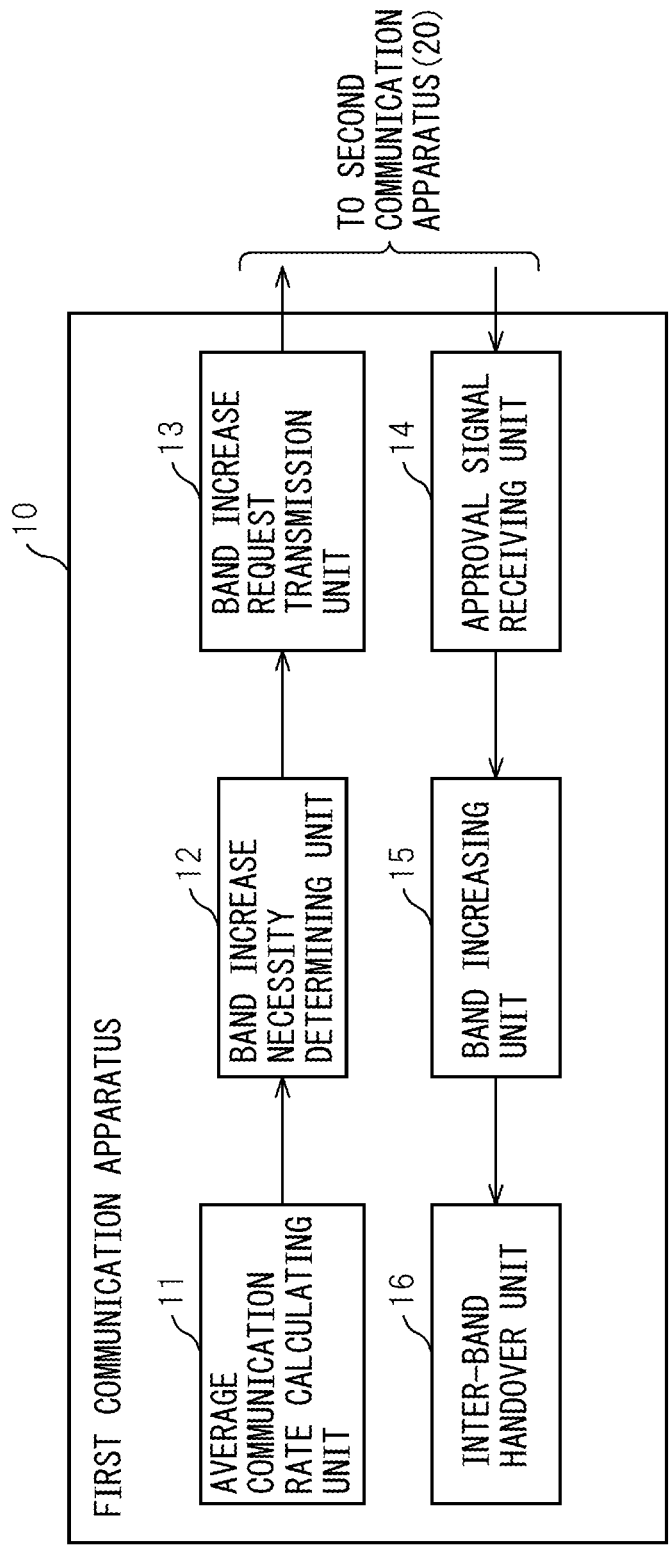
FIG. 7 is a diagram depicting a second exemplary construction of the first communication apparatus.

Another embodiment of the first communication apparatus 10 will be described. FIG. 7 is a diagram depicting a second exemplary construction of the first communication apparatus 10. In the embodiment depicted in FIG. 3, even when the frequency band used by the first communication apparatus 10 is increased, the added frequency band cannot accommodate the access at once. Thus, existing communication rate cannot be improved soon. Connection to the third communication apparatus 30 arises newly and utilizes the added frequency band, so that the communication rate of access to the first communication apparatus 10 is gradually leveled.

On the other hand, the first communication apparatus 10 depicted in FIG. 7 includes an inter-band handover unit 16. Other constituents 11 to 15 depicted in FIG. 7 are the same as the constituents 11 to 15 depicted in FIG. 3. When the frequency band used by the first communication apparatus 10 is increased, the inter-band handover unit 16 hands-over some of access accommodated in the frequency band before the increase to the added frequency band after the increase. For example, the inter-band handover unit 16 may carry out handover of access between frequency bands by using existing handover technology between different frequencies.

In accordance with the present embodiment, it is possible, when the frequency band used by the first communication apparatus 10 is increased, to utilize the added frequency band soon, so that utilization efficiency of frequency band can be further improved.

Figure 8:
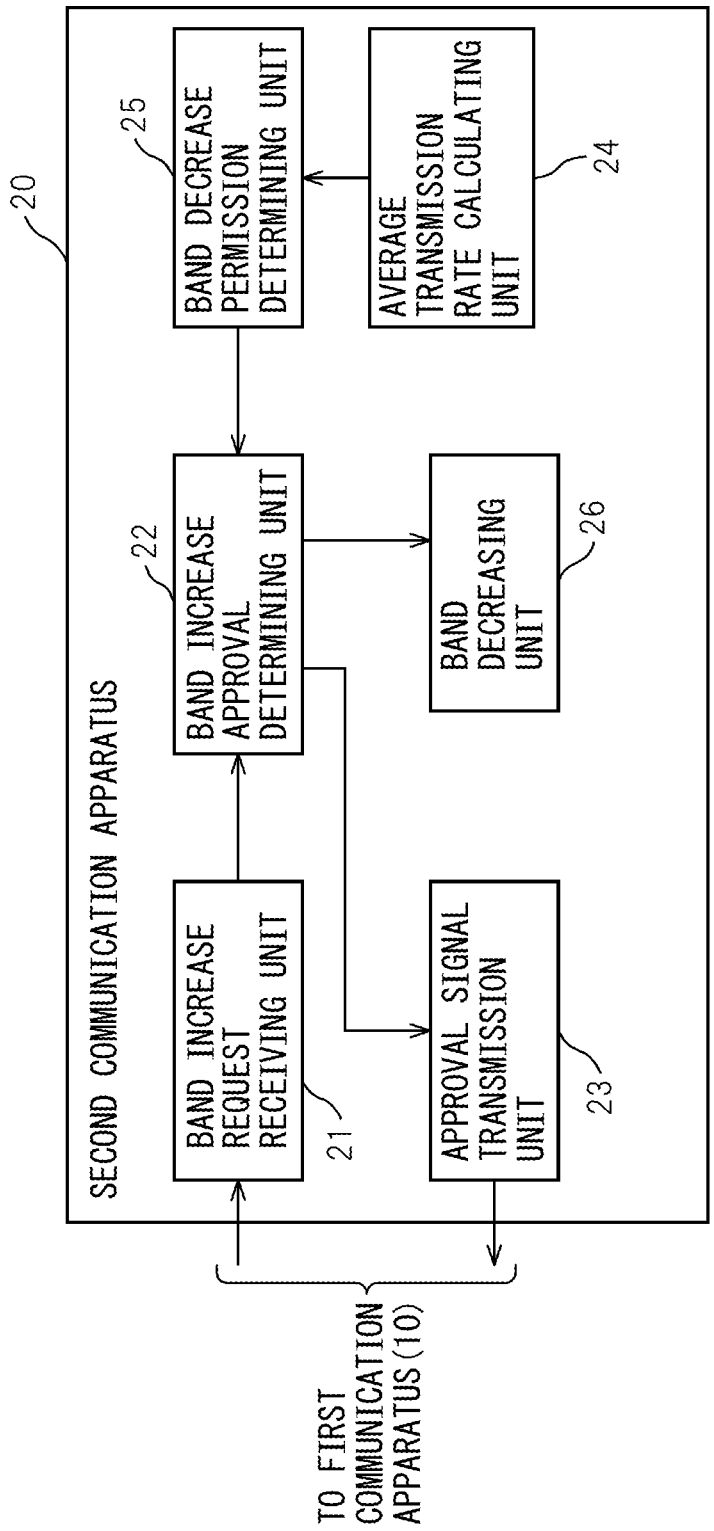
FIG. 8 is a diagram depicting a second exemplary construction of the second communication apparatus.

Other embodiment of the second communication apparatus 20 will be described. FIG. 8 is a diagram depicting a second exemplary construction of the second communication apparatus 20. The second communication apparatus 20 includes a band increase request receiving unit 21, a band increase approval determining unit 22, an approval signal transmission unit 23, an average communication rate calculating unit 24, a band decrease permission determining unit 25, and a band decreasing unit 26. The processing performed by the band increase request receiving unit 21 and the approval signal transmission unit 23 is the same as the processing illustrated with reference to FIG. 4.

The average communication rate calculating unit 24 calculates the average communication rate va per access to the second communication apparatus 20 in the same manner as the average communication rate calculating unit 11 described above. The band decrease permission determining unit 25 determines whether or not decrease of the frequency band used by the second communication apparatus 20 is to be permitted based on the average communication rate va. For example, the band decrease permission determining unit 25 determines that the frequency band used by the first communication apparatus 10 may be decreased when the average communication rate va is larger than a prescribed upper bound threshold T2.

The band decrease permission determining unit 25 may calculates the permissible decrement of the frequency band used by the second communication apparatus 20. For example, the band increase necessity determining unit 12 may calculate the communication rate difference which is the difference between the upper bound threshold T2 or the value obtained by subtracting a prescribed margin from this and the average communication rate va. The band increase necessity determining unit 12 may calculate the least number of unit frequency band B1 to Bn as the permissible decrement.

If the decrease of the frequency band is permitted, the band increase approval determining unit 22 determines whether or not increase of the frequency band used by the first communication apparatus 10 is to be approved according as there is or there is not unused frequency band after the frequency band used by the second communication apparatus 20.

The band decreasing unit 26 decreases the frequency band used by the second communication apparatus 20 when decrease of the frequency band used by the second communication apparatus 20 is permitted. For example, the band decreasing unit 26 may decrease the frequency band used by the second communication apparatus 20 by one unit frequency band B1 to Bn. For example, if the band decrease permission determining unit 25 calculates the permissible decrement, the band decreasing unit 26 may decrease the frequency band used by the second communication apparatus 20 by this permissible decrement.

Figure 9:
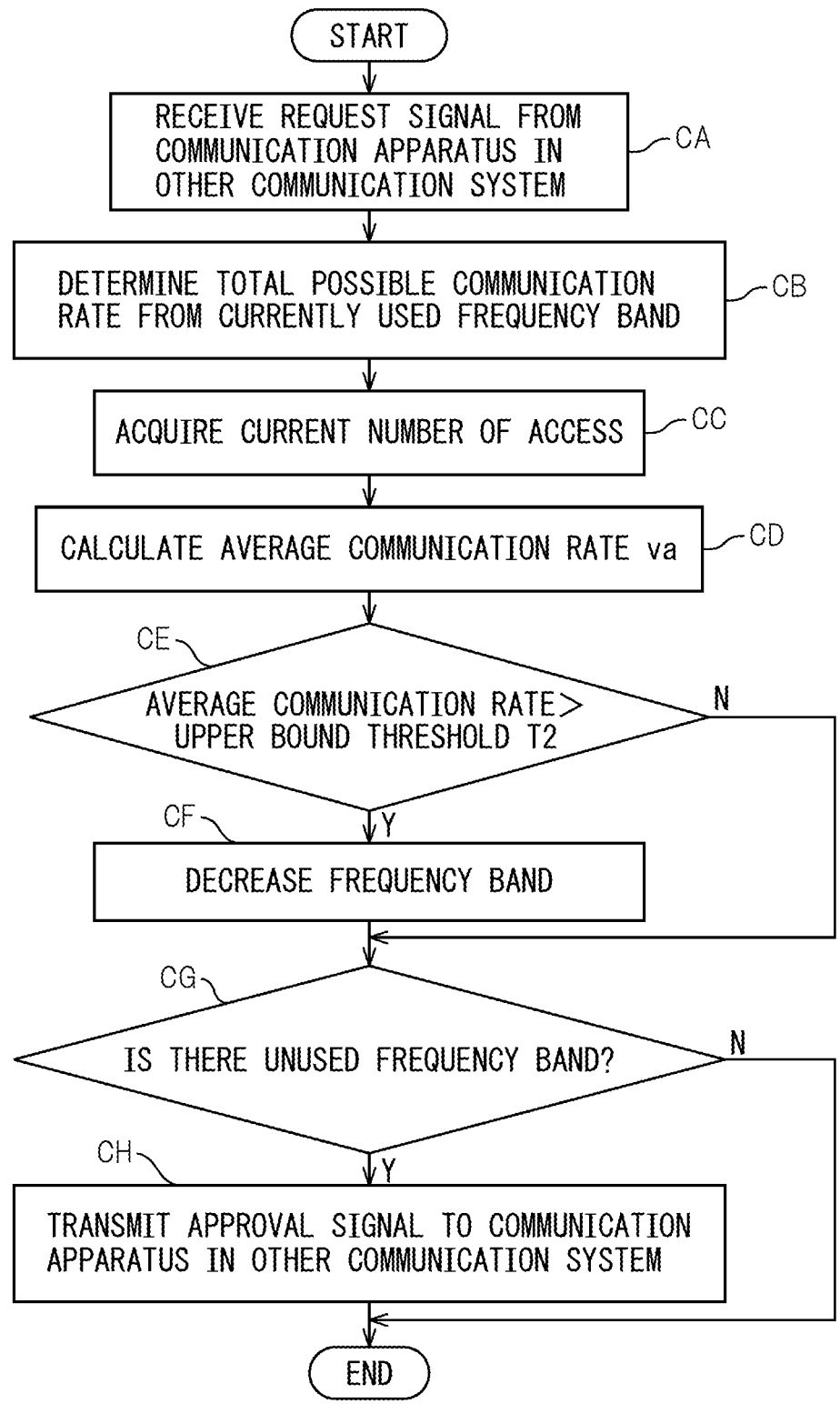
FIG. 9 is a diagram illustrating a second example of the processing performed in the second communication apparatus.

FIG. 9 is a diagram illustrating a second example of the processing performed by the second communication apparatus 20. In other embodiments, each of the following operations CA to CH may be a step. The second communication apparatus 20 may execute the operations CA to CH, when, for example, a request signal is received from the first communication apparatus 10.

In operation CA, the band increase request receiving unit 21 receives a request signal from the first communication apparatus 10. In operation CB, the average communication rate calculating unit 24 calculates total communication rate of all access to the second communication apparatus 20 based on the bandwidth of the frequency band used by the second communication apparatus 20 and the nominal rate of the second communication system 2.

In operation CC, the average communication rate calculating unit 24 acquires the current number of access to the second communication apparatus 20. In operation CD, the average communication rate calculating unit 24 calculates the average communication rate va by dividing the total communication rate of all access by the current number of access to the second communication apparatus 20.

In operation CE, the band decrease permission determining unit 25 determines whether or not the average communication rate va is larger than a prescribed upper bound threshold T2. If the average communication rate va is larger than a prescribed upper bound threshold T2 (operation CE: Y), the processing proceeds to operation CF. If the average communication rate va is not larger than a prescribed upper bound threshold T2 (operation CE: N), the processing proceeds to operation CG.

In operation CF, the band decreasing unit 26 decreases the frequency band used by the second communication apparatus 20. Thereafter, the processing proceeds to operation CG. In operation CG, the band increase approval determining unit 22 determines whether or not there is unused frequency band. If there is unused frequency band (operation CG: Y), the processing proceeds to operation CH. If there is not unused frequency band (operation CG: N), the processing is terminated.

In operation CH, the approval signal transmission unit 23 transmits an approval signal approving increase of the frequency band used by the first communication apparatus 10 to the first communication apparatus 10.

In order to increase the frequency band in the first communication apparatus 10, the first communication apparatus 10 may disconnect momentarily the connection of each access, and restore the connection after bandwidth of the frequency band is changed. In order to increase the frequency band in the first communication apparatus 10, a technology for integrating the frequency bandwidth such as DC-HSPDA (Dual Cell High Speed Downlink Packet Access), frequency aggregation, etc. The frequency band used by the second communication apparatus 20 may be decreased in the same manner. The frequency band may be changed in the same manner in other embodiments described below.

In accordance with the present embodiment, the second communication apparatus 20 can dynamically change the frequency bandwidth used by the second communication apparatus 20 in accordance with the average communication rate va per access to the second communication apparatus 20. Since, in accordance with the present embodiment, the frequency band used in a communication apparatus at excessively large average communication rate va can be dynamically decreased, so that the utilization efficiency of the frequency band can be improved.

Figure 10:
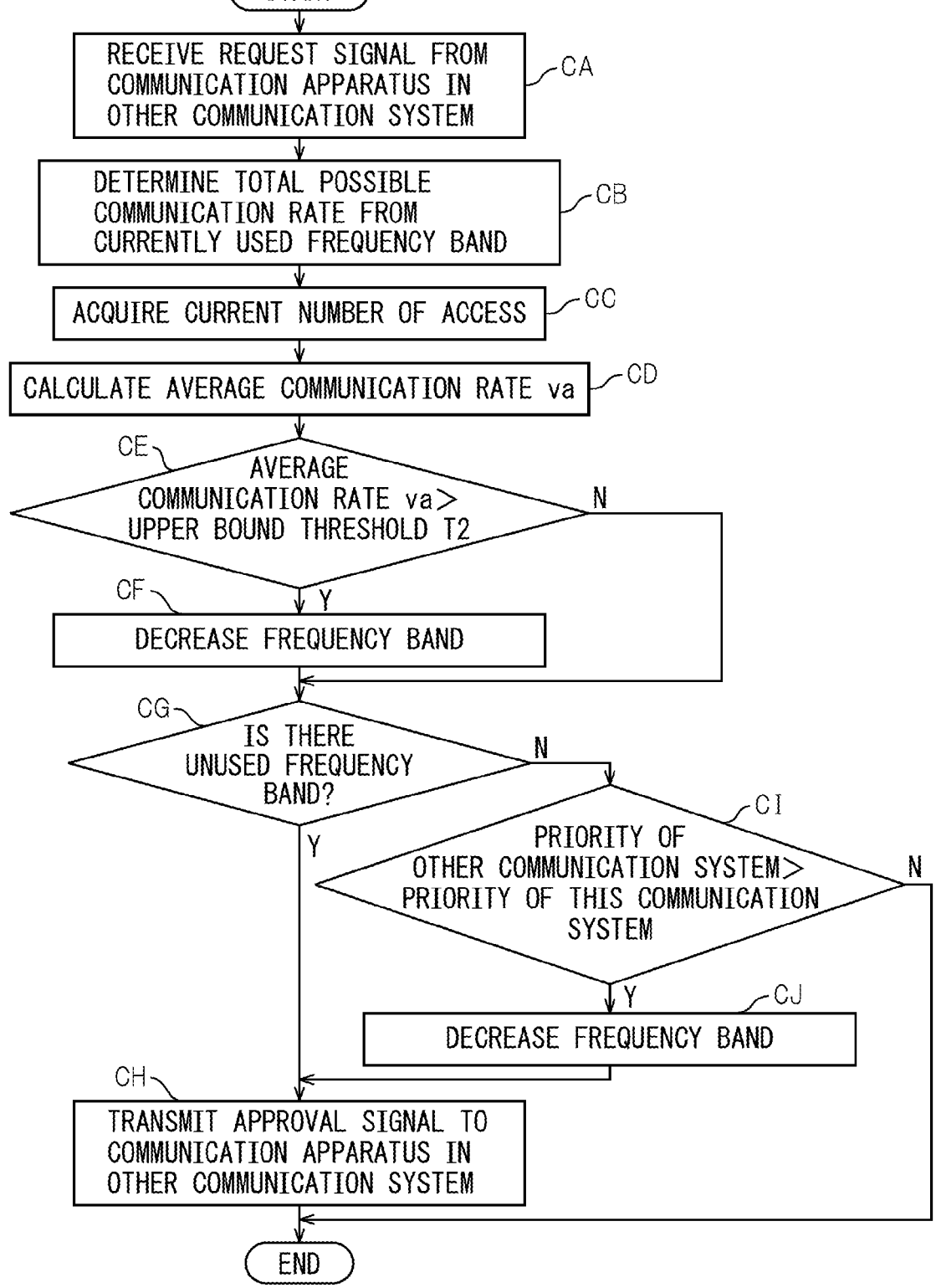
FIG. 10 is a diagram illustrating a third example of the processing performed in the second communication apparatus.

Another example of the processing performed by the second communication apparatus 20 will be described. FIG. 10 is a diagram illustrating a third example of the processing performed by the second communication apparatus 20. In other embodiments, each of the following operations CA to CJ may be a step. The second communication apparatus 20 may execute the operations CA to CJ, when, for example, a request signal is received from the first communication apparatus 10.

The processing in operations CA to CH is the same as the processing of operations CA to CH illustrated above with reference to FIG. 9. In this example, however, if, in operation CG, the band increase approval determining unit 22 determines that there is no unused frequency band (operation CG: N), the processing proceeds to operation CI.

In operation CI, the band increase approval determining unit 22 determines whether or not the priority imparted to the first communication system 1 in advance is higher than the priority imparted to the second communication system 2 in advance. If the priority imparted to the first communication system 1 is higher than the priority imparted to the second communication system 2 (operation CI: Y), the processing proceeds to operation CJ. If the priority imparted to the first communication system 1 is not higher than the priority imparted to the second communication system 2 (operation CI: N), the processing is terminated.

In operation CJ, the band decreasing unit 26 decreases the frequency band used by the second communication apparatus 20. Thereafter, the processing proceeds to operation CH. In operation CH, the approval signal transmission unit 23 transmits an approval signal to the first communication apparatus 10.

In accordance with this example, when a total sum of bandwidth of the frequency band which plural communication systems 1 and 2 desire to be allocated exceeds total bandwidth of usable frequency band, it is possible to determine a communication system to which frequency band is to be allocated preferentially.

Figure 11:
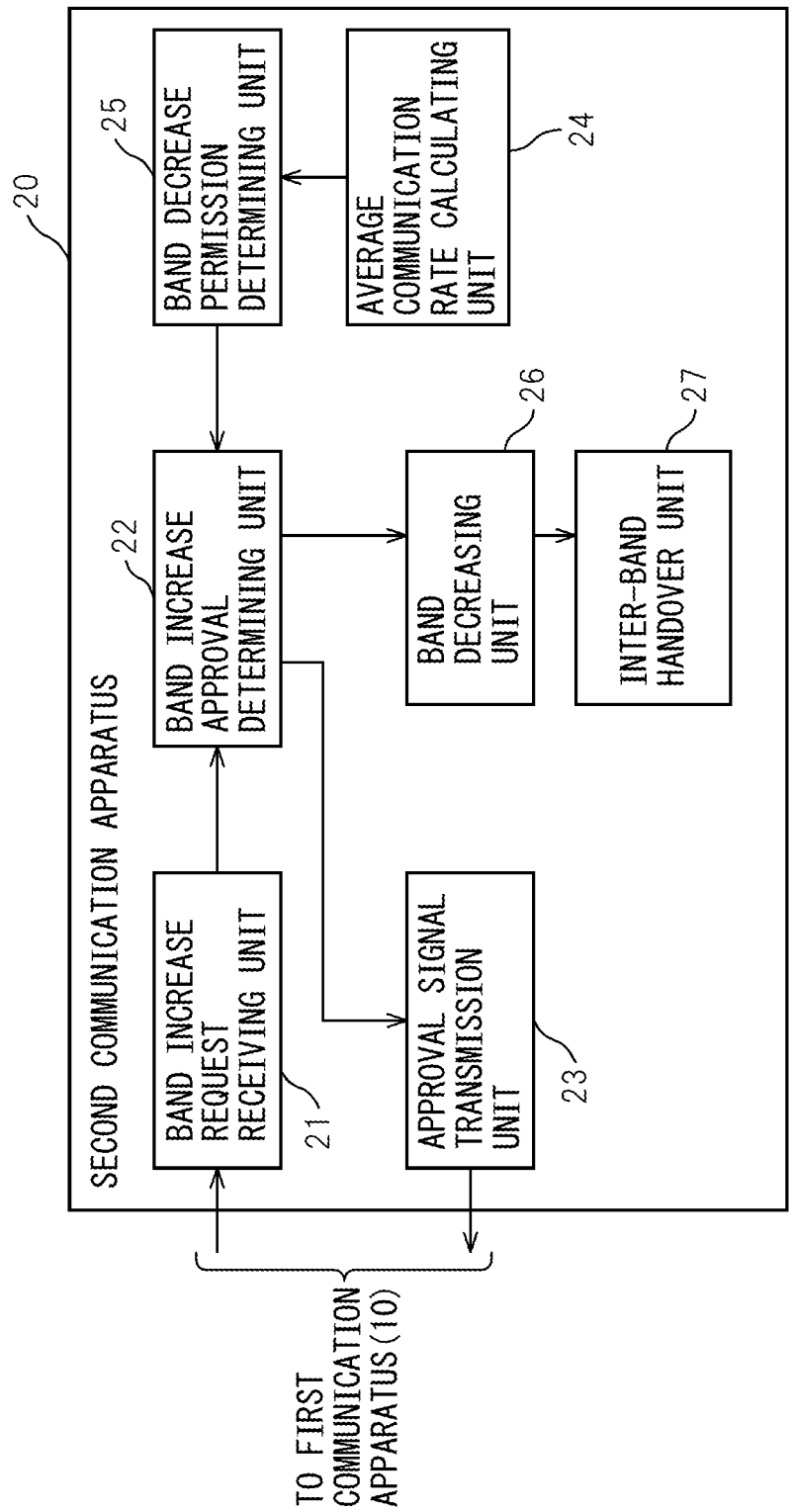
FIG. 11 is a diagram depicting a third exemplary construction of the second communication apparatus.

Another embodiment of the second communication apparatus 20 will be described. FIG. 11 is a diagram depicting a third exemplary construction of the second communication apparatus 20. The second communication apparatus 20 includes an inter-band handover unit 27. Other constituents 21 to 26 are respectively the same as the constituents depicted in FIG. 8. Another example depicted below may include an inter-band handover unit 27.

When the frequency band used by the second communication apparatus 20 is decreased, the inter-band handover unit 27 hands over access accommodated in the frequency band for which use is stopped by the decrease of the frequency band to the frequency band which continues to be used by the second communication apparatus 20.

Figure 12:
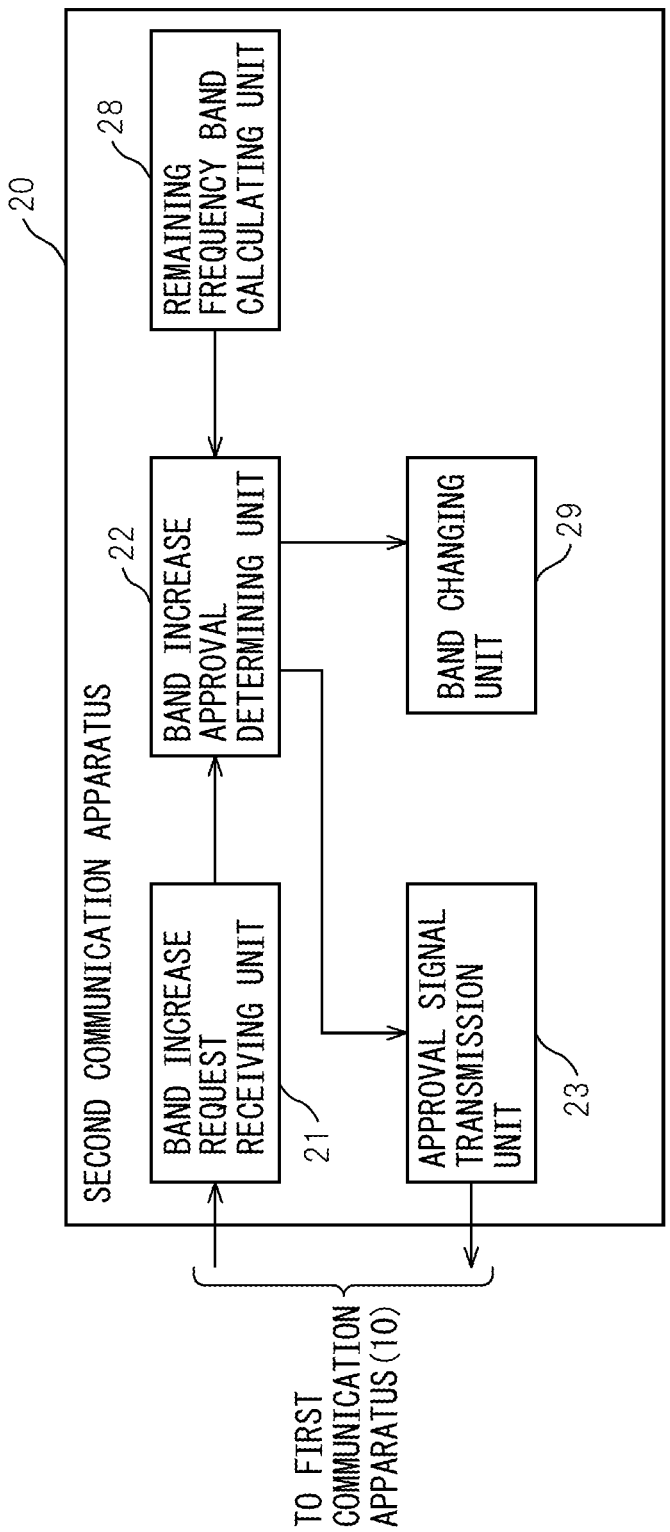
FIG. 12 is a diagram depicting a fourth exemplary construction of the second communication apparatus.

Next, another embodiment of the second communication apparatus 20 will be described. FIG. 12 is a diagram depicting a fourth exemplary construction of the second communication apparatus 20. The second communication apparatus 20 includes a band increase request receiving unit 21, a band increase approval determining unit 22, an approval signal transmission unit 23, a remaining frequency band calculating unit 28 and a band decreasing unit 29. The processing performed by the band increase request receiving unit 21 and the approval signal transmission unit 23 are the same as the processing described with reference to FIG. 4.

The remaining frequency band calculating unit 28 calculates the bandwidth Wr of remaining frequency band by the following equation (1).

$$\text{Bandwidth } Wr \text{ of remaining frequency band} = Wa - (W1+W2) \quad (1)$$

In the equation (1), Wa represents the bandwidth of entire frequency band Ba. W1 is bandwidth of the frequency band used by the first communication apparatus 10 when it is increased by the increment requested by the request signal. W2 is desired bandwidth of the frequency band used by the second communication apparatus 20.

Various methods can be used as calculating method for the desired frequency bandwidth W2. For example, the remaining frequency band calculating unit 28 may calculate the desired frequency bandwidth W2 based on the number of access to the second communication apparatus 20 and nominal rate of the second communication system 2 and a prescribed target value on the average communication rate per access. For example, the remaining frequency band calculating unit 28 may calculate the desired frequency bandwidth W2 by a method to be described later with reference to FIG. 14.

The band increase approval determining unit 22 approves the increase of the frequency band as requested by the request signal if the remaining frequency bandwidth Wr is not less than "0". When the remaining frequency bandwidth Wr is less than "0", the band increase approval determining unit 22 may not approve the increase of the frequency band as requested by the request signal. At this time, the second communication apparatus 20 may transmit disapproval signal inhibiting the increase of the frequency band to the first communication apparatus 10.

For example, when the remaining frequency bandwidth Wr is less than "0", the band increase approval determining unit 22 may compare the priority imparted to the first communication system 1 in advance with the priority imparted to the second communication system 2 in advance. When the priority imparted to the first communication system 1 is higher than the priority imparted to the second communication system 2, the band increase approval determining unit 22 may approve the increase of the frequency band as requested by the request signal.

When the frequency bandwidth W2 calculated by the remaining frequency band calculating unit 28 differs from the frequency bandwidth being actually used by the second communication apparatus 20, the band changing unit 29 changes the frequency bandwidth being used by the second communication apparatus 20 to the frequency bandwidth W2 to be used. Also, when the priority of the first communication system 1 is higher than the priority of the second communication system 2, the band changing unit 29 decreases the frequency band used by the second communication apparatus 20 as needed in order to increase the frequency band used by the first communication apparatus 10.

Figure 13:
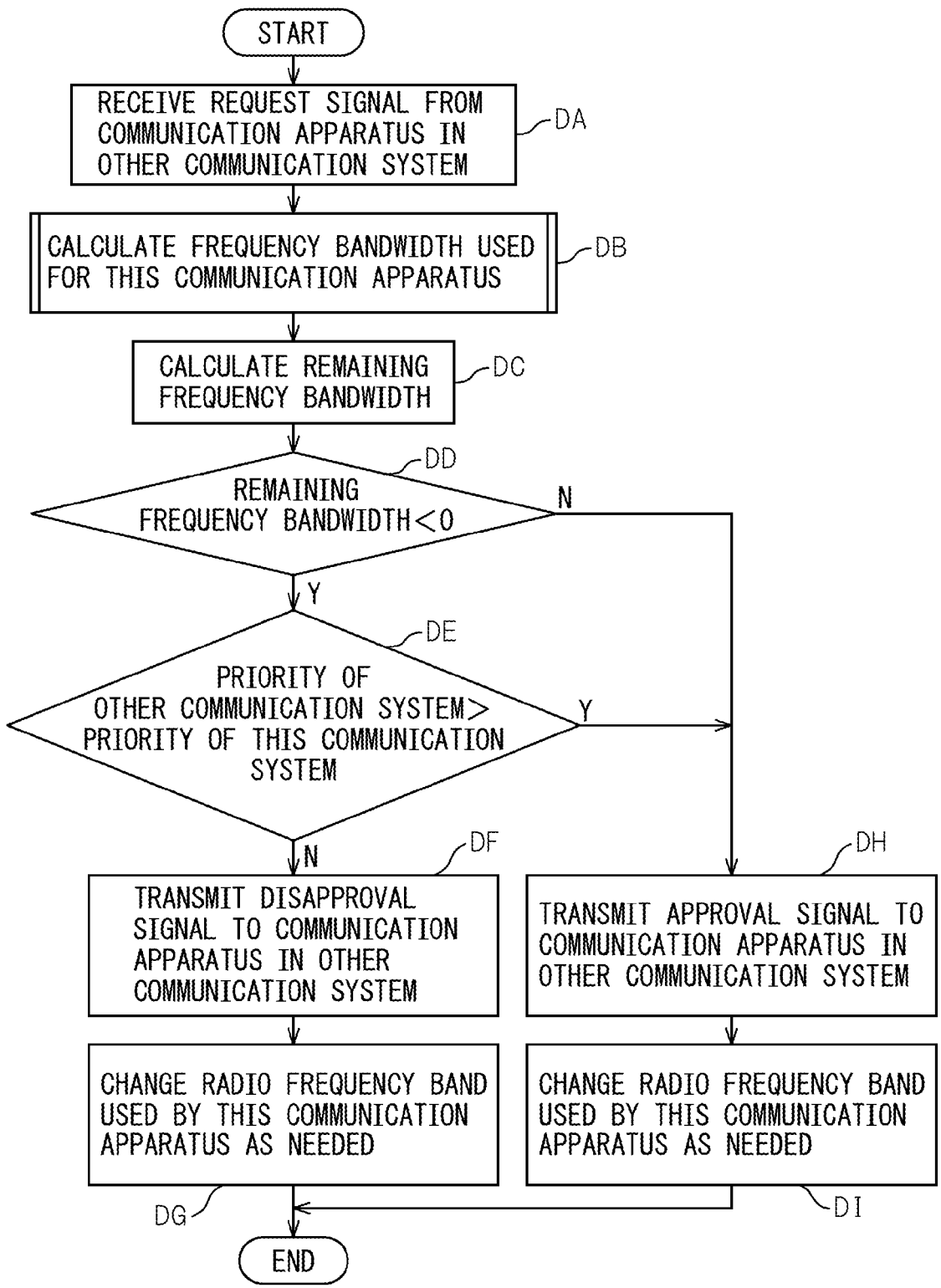
FIG. 13 is a diagram illustrating a fourth example of the processing performed in the second communication apparatus.

FIG. 13 is a diagram illustrating a fourth example of the processing performed by the second communication apparatus 20. In other embodiments, each of the following operations DA to DI may be a step. The second communication apparatus 20 may execute operations DA to DI, when, for example, a request signal from the first communication apparatus 10 is received.

In operation DA, the band increase request receiving unit 21 receives a request signal from the first communication apparatus 10. In operation DB, the remaining frequency band calculating unit 28 calculates desired frequency bandwidth W2 used by the second communication apparatus 20.

Figure 14:
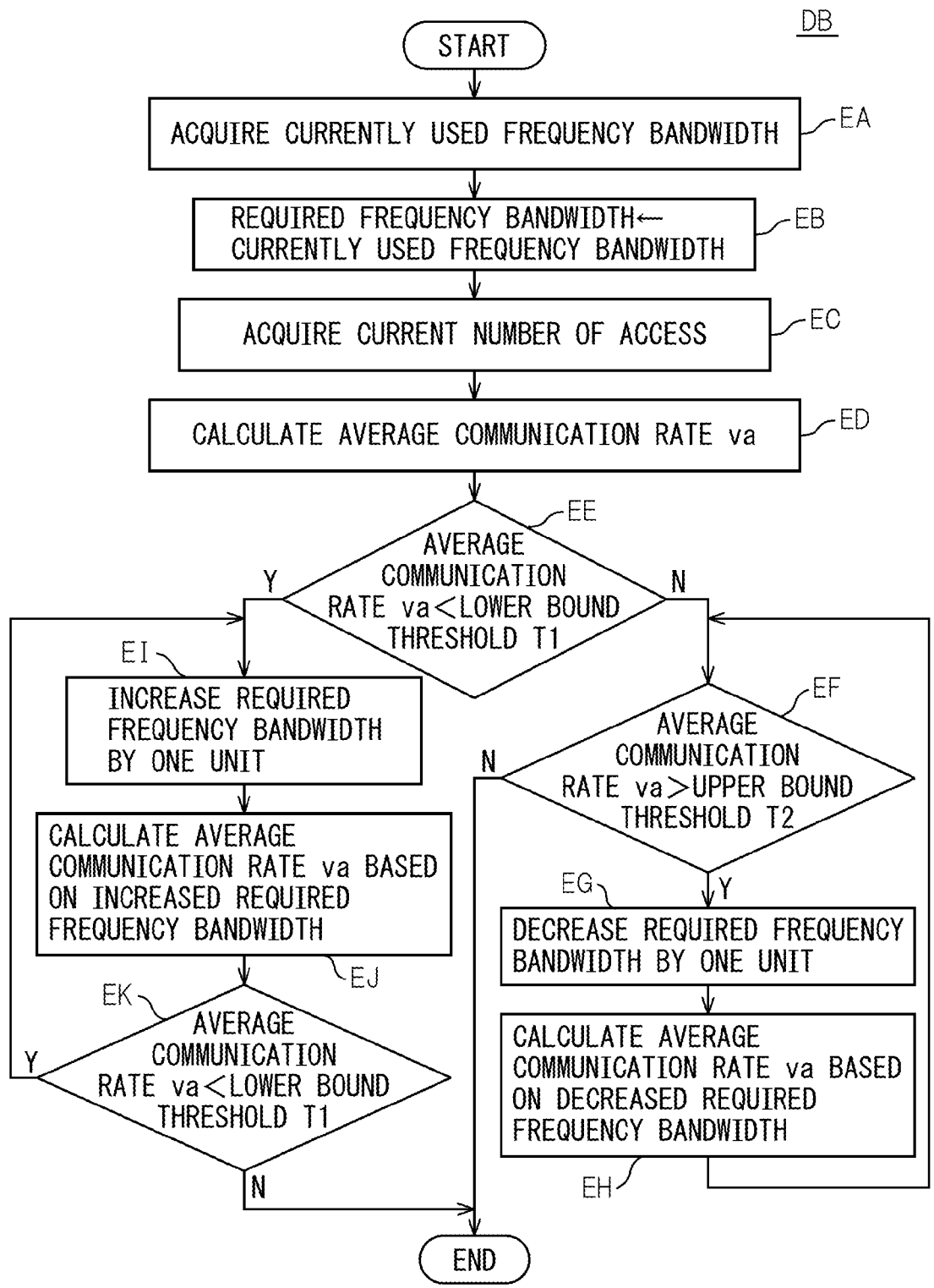
FIG. 14 is a diagram illustrating an example of the calculation processing for calculating necessary frequency band.

FIG. 14 is a diagram illustrating an example of the processing DB for calculating the desired frequency bandwidth W2. In other embodiments, each of the following operations EA to EK may be a step. In operation EA, the frequency band calculating unit 28 acquires the currently used frequency band being used by the second communication apparatus 20 and determines the bandwidth.

In operation EB, the remaining frequency band calculating unit 28 temporarily substitutes the value of the currently used frequency bandwidth into the desired frequency bandwidth W2. In operation EC, the remaining frequency band calculating unit 28 acquires the current number of access to the second communication apparatus 20. In operation ED, the remaining frequency band calculating unit 28 calculates the average communication rate va per access by dividing the communication rate that can be accommodated in the currently used frequency bandwidth by the current number of access.

In operation EE, the remaining frequency band calculating unit 28 determines whether or not the average communication rate va is smaller than a prescribed lower bound threshold T1. In place of this, the remaining frequency band calculating unit 28 may determine whether or not the average communication rate va is smaller than a value obtained by adding a margin to the lower bound threshold T1. If the average communication rate va is smaller than the prescribed lower bound threshold T1 (operation EE: Y), the processing proceeds to operation EI. If the average communication rate va is not smaller than the prescribed lower bound threshold T1 (operation EE: N), the processing proceeds to operation EF.

In operation EF, the remaining frequency band calculating unit 28 determines whether or not the average communication rate va is larger than the prescribed upper bound threshold T2. The remaining frequency band calculating unit 28 may, instead, determine whether or not the average communication rate va is larger than a value obtained by subtracting a margin from the prescribed upper bound threshold T2. If the average communication rate va is larger than the prescribed upper bound threshold T2 (operation EF: Y), the processing proceeds to operation EG.

If the average communication rate va is not larger than the prescribed upper bound threshold T2 (operation EF: N), the processing is terminated. When the average communication rate va calculated in operation ED based on the currently used frequency bandwidth is not smaller than the lower bound threshold T1 and not larger that the upper bound threshold T2, value of the desired frequency bandwidth W2 is equal to the value of the currently used frequency bandwidth.

In operation EG, the remaining frequency band calculating unit 28 decreases the desired frequency bandwidth W2 by one unit bandwidth W. In operation EH, the remaining frequency band calculating unit 28 calculates the average communication rate va per access by dividing the communication rate that can be accommodated in the decreased desired frequency bandwidth W2 by current number of access. Thereafter, the processing returns to operation EF.

Thus, operations EF to EH are executed repeatedly until the average communication rate va calculated on the basis of the desired frequency bandwidth W2 becomes smaller than the prescribed upper bound threshold T2. When the average communication rate va calculated on the basis of the desired frequency bandwidth W2 becomes smaller than the prescribed upper bound threshold T2, the processing is terminated.

In operation EI, the remaining frequency band calculating unit 28 increases the value of the desired frequency bandwidth W2 by one unit bandwidth W. In operation Ej, the remaining frequency band calculating unit 28 calculates the average communication rate va per access by dividing the communication rate that can be accommodated in the increase desired frequency bandwidth W2 by current number of access.

In operation EK, the remaining frequency band calculating unit 28 determines, as in operation EE, whether or not the average communication rate va is smaller than a prescribed lower bound threshold T1. If the average communication rate va is smaller than a prescribed lower bound threshold T1 (operation EE: Y), the operation returns to operation EI. If the average communication rate va is not smaller than a prescribed lower bound threshold T1 (operation EE: N), the processing is terminated.

Thus, operations EI to EK are executed repeatedly until the average communication rate va calculated on the basis of the desired frequency bandwidth W2 becomes larger than the prescribed lower bound threshold T1. When the average communication rate va calculated on the basis of the desired frequency bandwidth W2 becomes larger than the prescribed lower bound threshold T1, the processing is terminated.

Referring to FIG. 13, in operation DC, the remaining frequency band calculating unit 28 calculates the remaining frequency bandwidth Wr in accordance with equation (1). In operation DD, the band increase approval determining unit 22 determines whether or not the remaining frequency bandwidth Wr is smaller than "0". If the remaining frequency bandwidth Wr is smaller than "0" (operation DD: Y), the processing proceeds to operation DE. If the remaining frequency bandwidth Wr is not smaller than "0" (operation DD: N), the processing proceeds to operation DH.

In operation DE, the band increase approval determining unit 22 determines whether or not the priority imparted to the first communication system 1 is higher than the priority imparted to the second communication system 2. If the priority imparted to the first communication system 1 is higher than the priority imparted to the second communication system 2 (operation DE: Y), the processing proceeds to operation DH. If the priority imparted to the first communication system 1 is not higher than the priority imparted to the second communication system 2 (operation DE: N), the processing proceeds to operation DF.

In operation DF, the second communication system 20 transmits a disapproval signal inhibiting increase of the frequency band to the first communication system 10. In operation DG, the band changing unit 29 changes the frequency bandwidth used by the second communication apparatus 20 to the used frequency bandwidth W2.

In operation DH, the approval signal transmission unit 23 transmits an approval signal to the first communication apparatus 10. In operation DI, the band changing unit 29 changes the frequency bandwidth used by the second communication apparatus 20 to the used frequency bandwidth W2 as needed.

When the priority of the first communication system 1 is higher than the priority of the first communication system 2, and, in order to increase the frequency band used by the first communication apparatus 10, decrease of the frequency band used by the second communication apparatus 20 is preferable, the band chaging unit 29 decreases the frequency bandwidth used by the second communication apparatus 20.

In accordance with the present embodiment, depending on the utilization state of plural communication systems, the frequency band used by the communication apparatuses in the communication systems can be dynamically adjusted based on the average communication rate.

Figure 15:
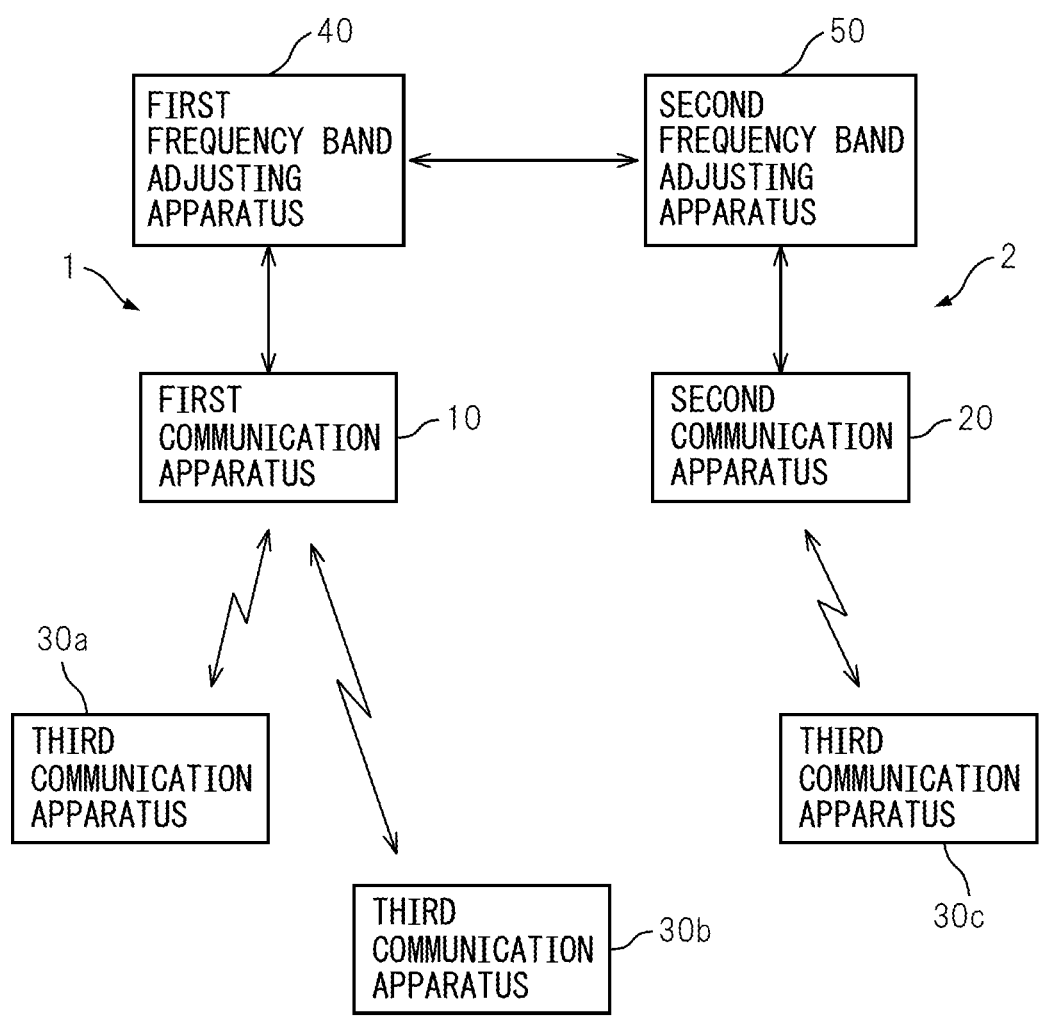
FIG. 15 is a diagram depicting a second exemplary construction of the communication system.

FIG. 15 is a diagram depicting a second exemplary construction of the communication systems. The communication system depicted in FIG. 15 includes a first frequency band adjusting apparatus 40 and a second frequency band adjusting apparatus 50. In the present embodiment, the above described processing for adjusting the frequency band used by the first communication apparatus 10 is executed by the first frequency band adjusting apparatus 40. For this purpose, the first frequency band adjusting apparatus 40 may include the constituents 11 to 15 depicted in FIG. 3, or the constituents 11 to 16 depicted in FIG. 7.

The second frequency band adjusting apparatus 50 executes the above-described processing for adjusting the frequency band used by the second communication apparatus 20. The second frequency band adjusting apparatus 50 may include the constituents 21 to 23 depicted in FIG. 4, the constituents 21 to 26 depicted in FIG. 8, the constituents 21 to 27 depicted in FIG. 11, or the constituents 21 to 23, 28 and 29 depicted in FIG. 12. The first frequency band adjusting apparatus 40 and the second frequency band adjusting apparatus 50 may separate independent apparatuses or may be one integrated unit.

In accordance with the present embodiment, by providing a frequency band adjusting apparatus as an apparatus separate from the communication apparatus, the present embodiment can be implemented without substantially modifying existing device construction.

Figure 16:
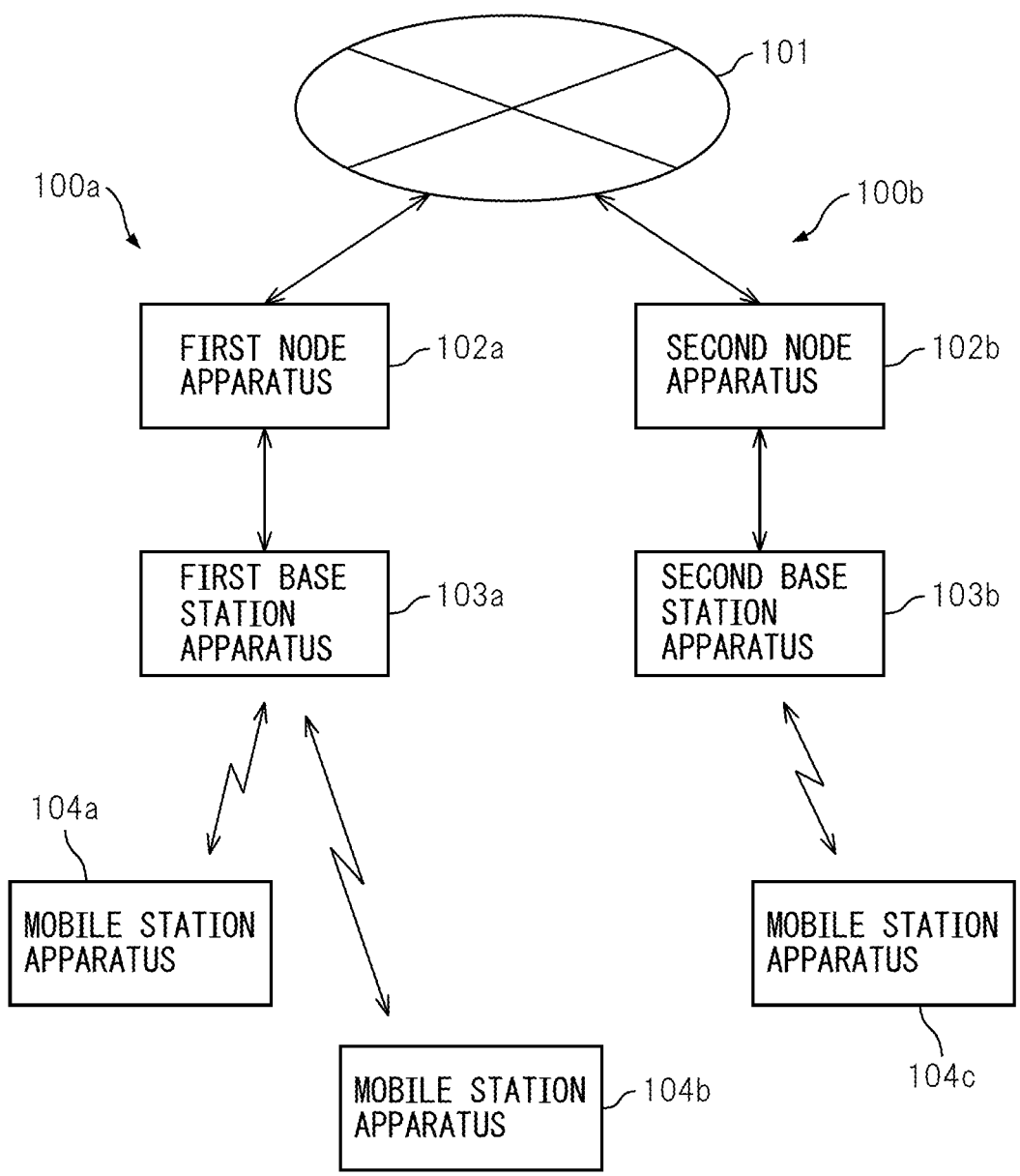
FIG. 16 is a diagram depicting a third exemplary construction of the communication system.

An embodiment will be described below in which the first communication apparatus 10 and the second communication apparatus 20 as described above are applied to base station apparatuses and the third communication apparatus is applied to a mobile station apparatus. FIG. 16 is a diagram depicting a third exemplary construction of the communication system. The first communication system 100a includes a first node apparatus 102a and a first base station apparatus 103a. The second communication apparatus 100b includes a second node apparatus 102b and a second base station apparatus 103b. The first base station apparatus 103a and the second base station apparatus 103b are connected to the network 101 via respective node apparatuses 102a and 102b.

In the first communication system 100a, the first base station apparatus 103a performs radio communication with mobile station apparatuses 104a and 104b. In the second communication system 100b, the second base station apparatus 103b performs radio communication with a mobile station apparatus 104c. The mobile station apparatuses 104a to 104c may be used both in the first communication system 100a and in the second communication system 100b.

The first communication system 100a and the second communication system 100b share the frequency band usable for radio communication with the mobile station apparatus 104. Coverage of first base station apparatus 103a and coverage of the second base station apparatus 103b overlap with each other.

In the description that follows, the node apparatuses 102a and 102b may be collectively denoted as "node apparatus 102". In the description that follows, the base station apparatuses 103a and 103b may be collectively denoted as "base station apparatus 103". In the description that follows, the mobile station apparatuses 104a to 104c may be collectively denoted as "mobile station apparatus 104".

Figure 17:
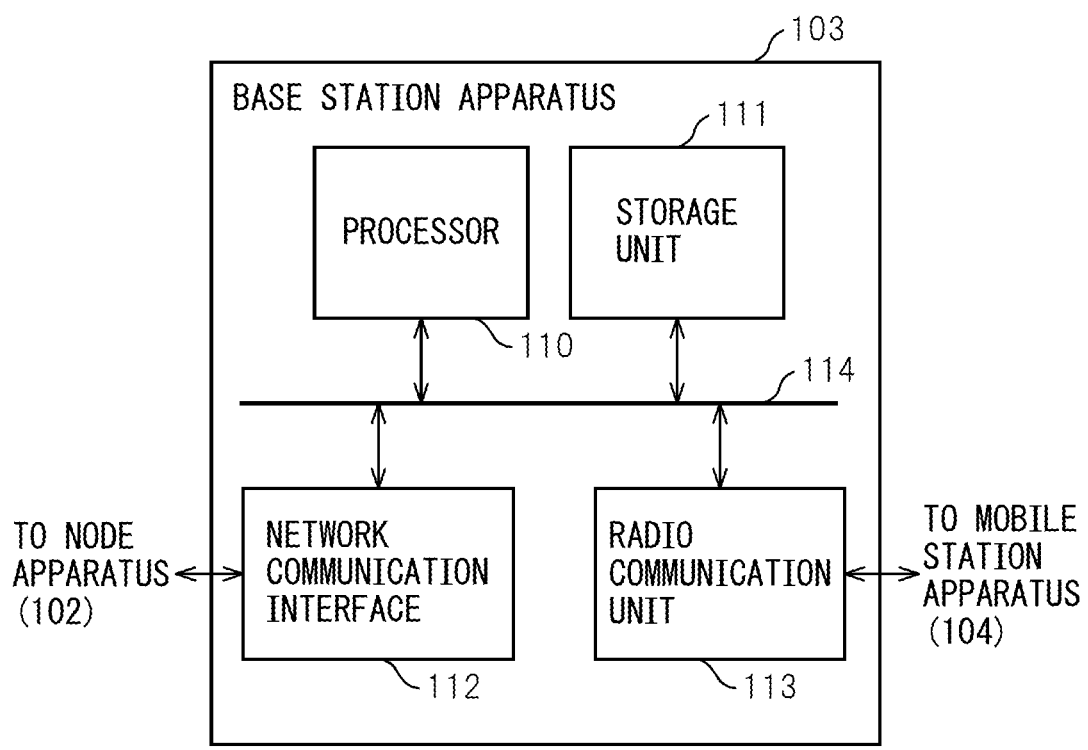
FIG. 17 is a diagram depicting the hardware construction of a base station apparatus.

FIG. 17 is a diagram depicting the hardware construction of the base station apparatus 103. The base station apparatus 103 includes a processor 11o, a storage unit 111, a network communication interface 112, a radio communication unit 113, and a bus 114. The processor 110, storage unit 111, network communication interface 112 and the radio communication unit 113 are connected to the data transmitting bus 114.

In the storage unit 111, various computer programs and data for controlling the operation of the base station apparatus 103 are stored. The storage unit 111 may include a storage device such as memory, and the like, and auxiliary storage device such as a hard disc, and the like. The processor 110 is a known data processing device, and executes the programs stored in the storage unit 111 and the processing for controlling the operation of the base station apparatus 103.

The network interface 112 carries out communication interface processing between the node apparatus 102 and the base station apparatus 103. The radio communication unit 113 executes radio communication processing with the mobile station apparatus 104. The hardware construction depicted in FIG. 17 is only an example of the hardware construction of the base station apparatus 103. Various kinds of hardware construction may be adopted for the base station apparatus 103 as long as the processing as described below can be executed.

Figure 18:
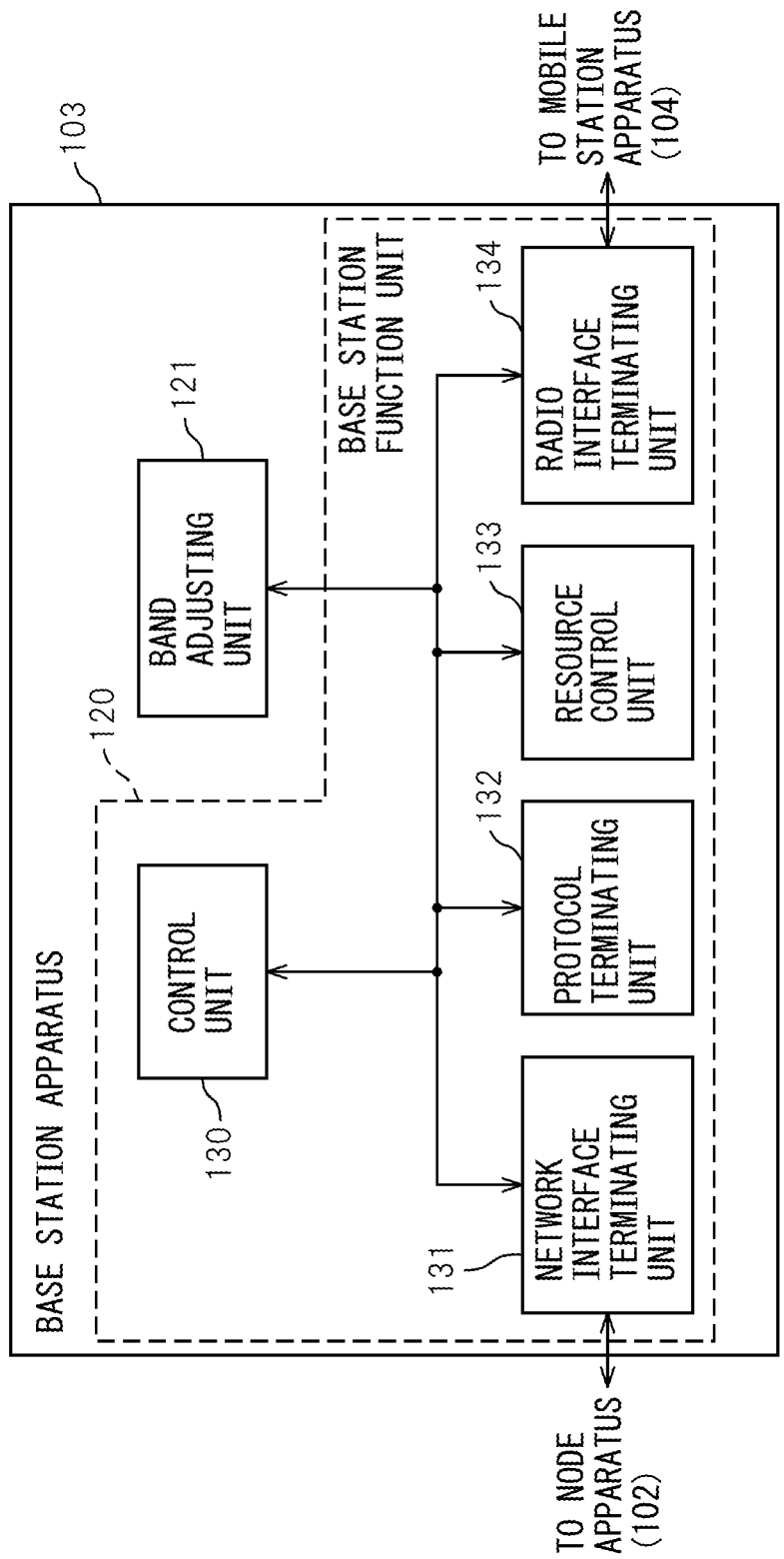
FIG. 18 is a block diagram depicting a first exemplary construction of the base station apparatus.

FIG. 18 is a block diagram depicting a first construction of the base station apparatus 103. Function of various blocks depicted in FIG. 18 is achieved by the processor 110 executing the programs stored in the storage unit 111. The drawing depicts mainly functions related to the present embodiment.

The base station apparatus 103 includes a base station function unit 120 and a band adjusting unit 121. The base station function unit 120 executed the processing of the base station 103 as a base station. The base station function unit 120 includes a network interface terminating unit 131, a protocol terminating unit 132, a resource control unit 133 and a radio interface terminating unit 134.

The network interface terminating unit 131 executes termination processing of signal transmitted and received between the node apparatus 102 and the network 101 and the base station apparatus 103. The radio interface terminating unit 134 executes termination processing of radio signal transmitted and received between the mobile station apparatus 104 and the base station apparatus 103.

The protocol terminating unit 132 executes termination processing of the communication protocol between the mobile station apparatus 104 and the base station apparatus 103. Also, the protocol terminating unit 132 executes termination processing of the communication protocol between the node apparatus 102 and the network 101 and the base station apparatus 103.

The resource control unit 133 controls the wireless resource used by the base station apparatus 103 for radio communication with the mobile station apparatus 104. The resource control unit 133 increases or decreases the frequency band used by the base station apparatus 103 for radio communication with the mobile station apparatus 104 in accordance with the band adjusting unit 121. The resource control unit 133 outputs a signal indicating the frequency band currently used for radio communication between the base station apparatus 103 and the mobile station apparatus 104 to the band adjusting unit 121. Also, the resource control unit 133 detects the number of access from the mobile station apparatus 104 to the base station apparatus 103. The resource control unit 133 outputs a signal indicating the detected number of access to the band adjusting unit 121.

Figure 19:
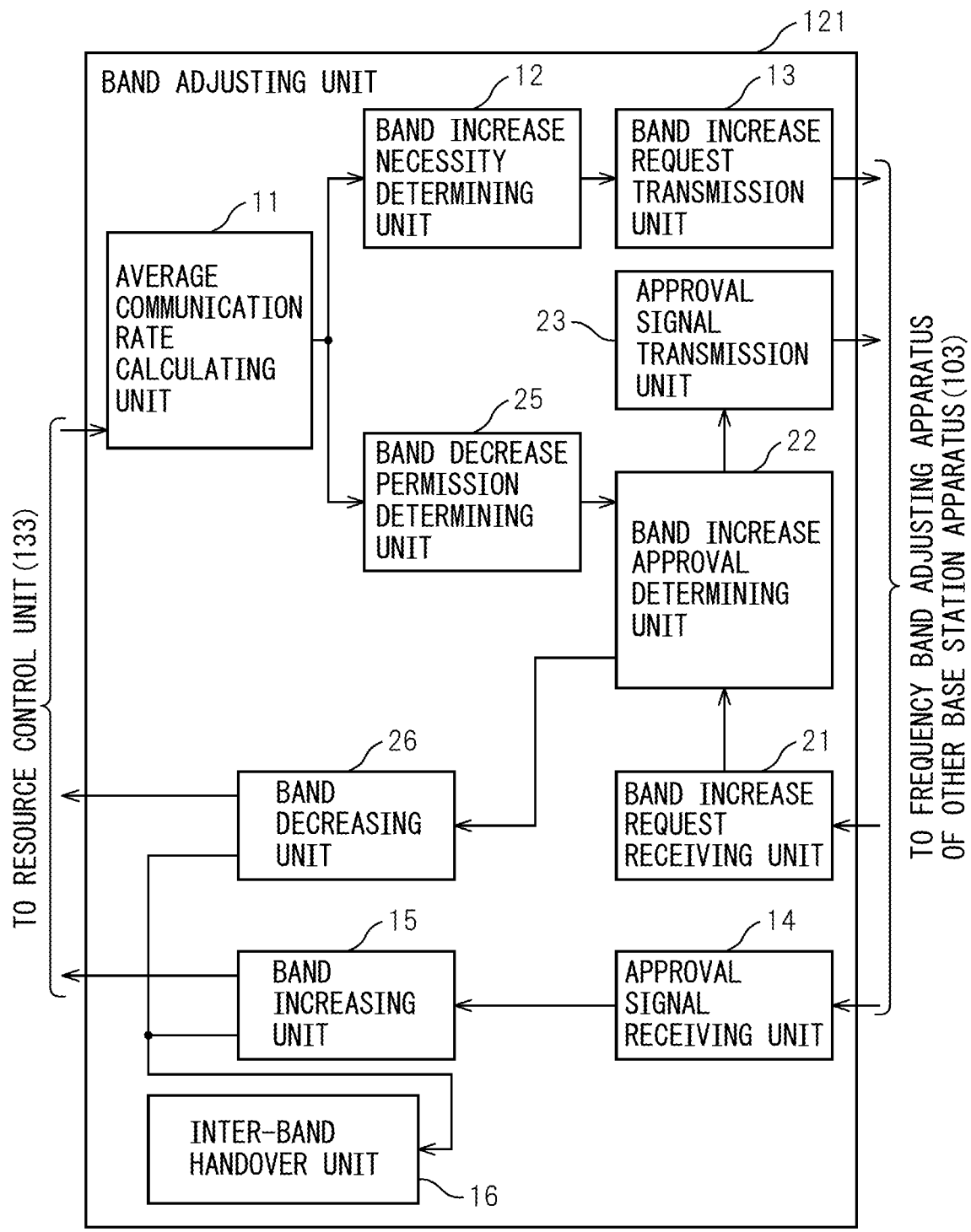
FIG. 19 is a block diagram depicting a first exemplary construction of a band adjusting unit.

FIG. 19 is a block diagram depicting a first exemplary construction of the band adjusting unit 121. The band adjusting unit 121 includes an average communication rate calculating unit 11, band increase necessity determining unit 12, band increase request transmission unit 13, an approval signal receiving unit 14, a band increasing unit 15 and an inter-band handover unit 16. Also, the band adjusting unit 121 includes a band increase request receiving unit 21, a band increase approval determining unit 22, an approval signal transmission unit 23, a band decrease permission determining unit 25, and a band decreasing unit 26.

When the band adjusting unit 121 of the first base station apparatus 103a carries out increase of the frequency band used by the first base station apparatus 103a, the constituents 11 to 16 performs the same processing as the constituents 11 to 16 depicted in FIG. 7. At this time, the average communication rate calculating unit 11 receives a signal from the resource control unit 133 indicating the number of access to the first base station apparatus 103a. Also, the average communication rate calculating unit 11 receives a signal from the resource control unit 133 indicating the currently used frequency band. When the frequency band used is to be increased, the band increasing unit 15 instructs increase of the frequency band used to the resource control unit 133. This applies also to other embodiments described below.

When the band adjusting unit 121 of the second base station apparatus 103b receives a request signal from the first base station apparatus 103a, the constituents 21 to 26 perform the same processing as the constituents 21 to 26 depicted in FIG. 11. The average communication rate calculating unit 11 performs the same processing as the average communication rate calculating unit 24 depicted in FIG. 11. The inter-band handover unit 16 performs the same processing as the inter-band handover unit 27 depicted in FIG. 11. At this time, the average rate calculating unit 11 receives a signal from the resource control unit 133 indicating the number of access to the second base station apparatus 103b. Also, the average rate calculating unit 11 receives a signal from the resource control unit 133 indicating currently used frequency band. When the used frequency band is to be decreased, the band decreasing unit 26 instructs decrease of the used frequency band to the resource control unit 133.

Figure 20:
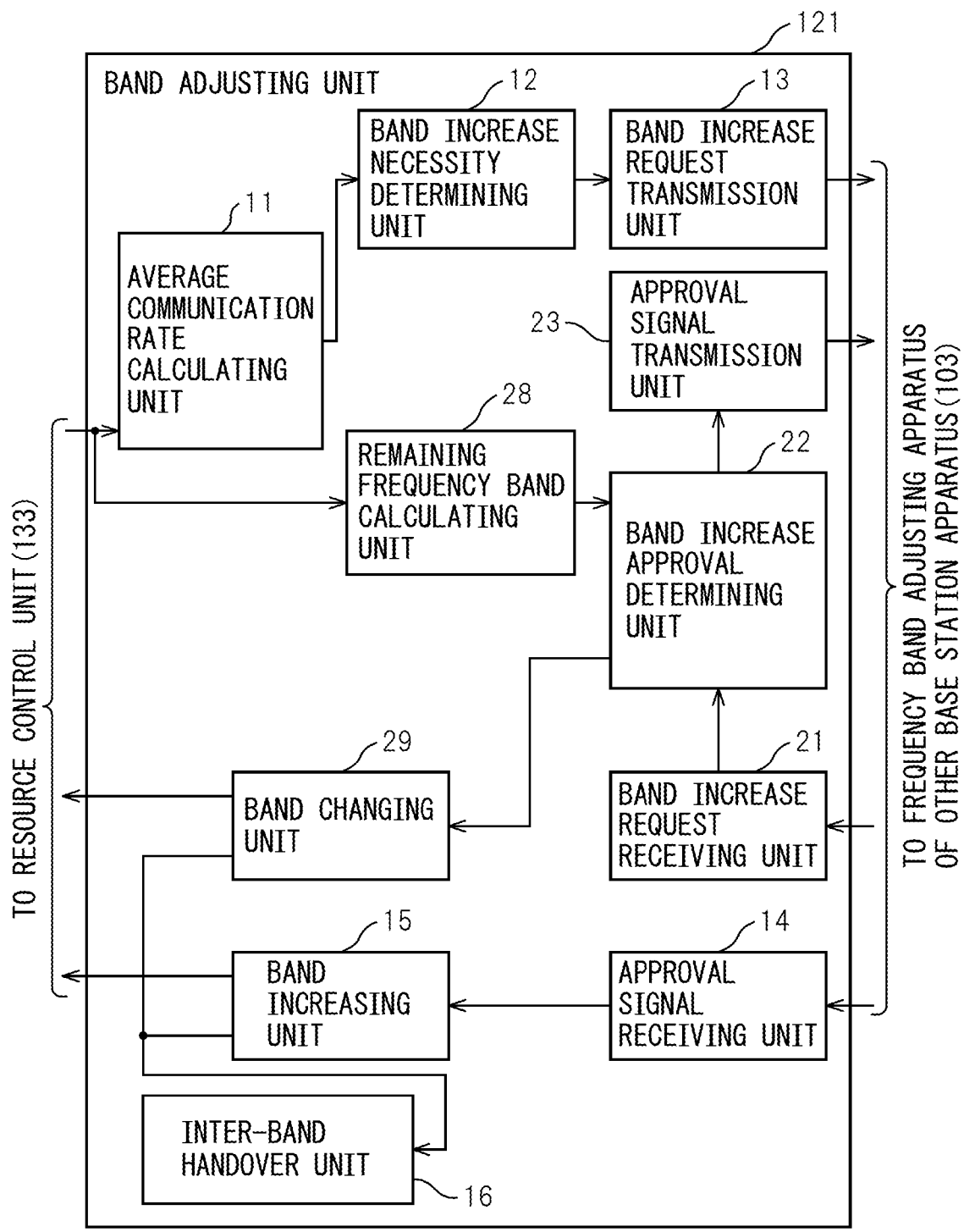
FIG. 20 is a block diagram depicting a second exemplary construction of the band adjusting unit.

FIG. 20 is a block diagram depicting a second exemplary construction of the band adjusting unit 121. The band adjusting unit 121 includes an average communication rate calculating unit 11, a band increase necessity determining unit 12, a band increase request transmission unit 13, an approval signal receiving unit 14, a band increasing unit 15, and an inter-band handover unit 16. Also, the band adjusting unit 121 includes a band increase request receiving unit 21, a band increase approval determining unit 22, an approval signal transmission unit 23, a remaining frequency band calculating unit 28, and a band changing unit 29.

When the band adjusting unit 121 of the second base station apparatus 103b receives a request signal from the first base station apparatus 103a, the constituents 21 to 23, 28 and 29 perform the same processing as the constituents 21 to 23, 28 and 29 depicted in FIG. 12. Also, the inter-band handover unit 16 performs the same processing as the inter-band handover unit 27 depicted in FIG. 11. At this time, the remaining frequency band calculating unit 28 receives a signal from the resource control unit 133 indicating the number of access to the second base station apparatus 103b. Also, the remaining frequency band calculating unit 28 receives a signal from the resource control unit 133 indicating the currently used frequency band. When the used frequency band is to be changed, the band changing unit 29 instructs change of the used frequency band to the resource control unit 133.

In accordance with the present embodiment, depending on the utilization state of plural communication systems, the frequency band used by the base station apparatuses in these communication systems can be dynamically adjusted based on the average communication rate.

Figure 21:
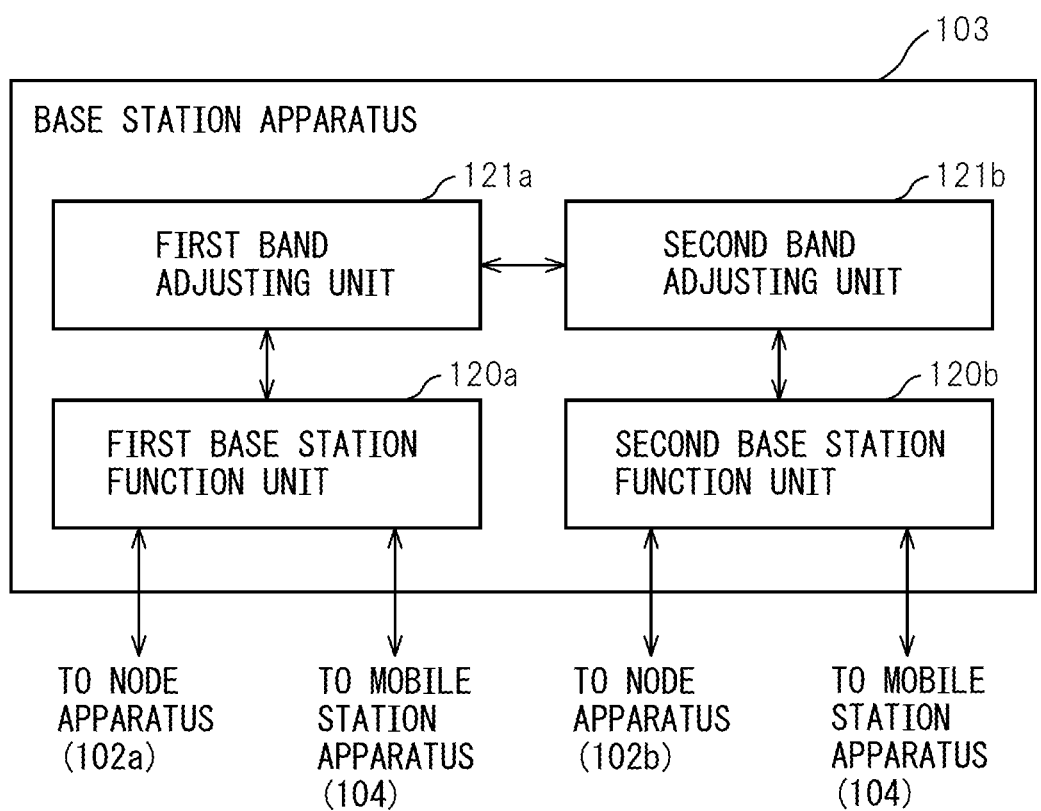
FIG. 21 is a block diagram depicting a second exemplary construction of the base station apparatus.

FIG. 21 is a block diagram depicting a second exemplary construction of the base station apparatus 103. One base station apparatus 103 includes both the base station function of the first communication system 100a and the base station function of the second communication system 100b. The base station apparatus 103 includes a first base station function unit 120a, a second base station function unit 120b, a first band adjusting unit 121a, and a second band adjusting unit 121b.

The construction and function of the first base station function unit 120a and the first band adjusting unit 121a may be the same as the construction and function of the base station function unit 120 and the band adjusting unit 121 described above with reference to FIGS. 18 to 20 on the first base station apparatus 103a. The construction and function of the second base station function unit 120b and the second band adjusting unit 121b may be the same as the construction and function of the base station function unit 120 and the band adjusting unit 121 described above with reference to FIGS. 18 to 20 on the second base station apparatus 103b.

In accordance with the present embodiment, when base station function of plural communication systems is realized in one base station apparatus, depending on the utilization state of respective systems, the frequency band used by the base station apparatuses in the communication systems can be dynamically adjusted based on the average communication rate.

Figure 22:
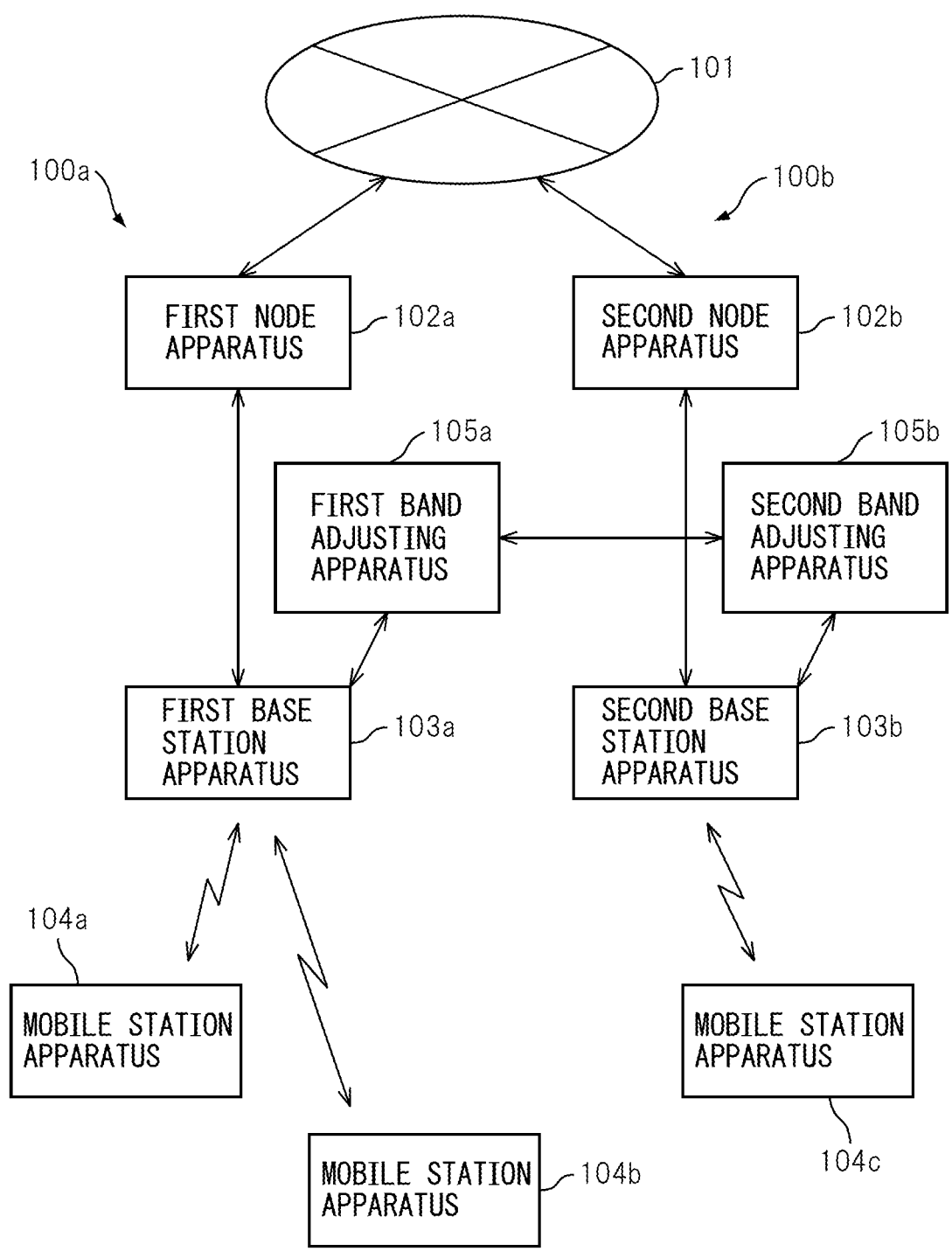
FIG. 22 is a diagram depicting a fourth exemplary construction of the communication system.

FIG. 22 is a diagram depicting a fourth exemplary construction of the communication system. The exemplary construction of the communication system includes a first frequency band adjusting apparatus 105a, a second frequency band adjusting apparatus 105b. In the present embodiment, the first frequency band adjusting apparatus 105a performs the processing for adjusting the frequency band used by the first base station apparatus 103a. For this purpose, the first frequency band adjusting apparatus 105a may include the band adjusting unit 121 depicted in FIG. 18.

The second frequency band adjusting apparatus 105b performs the processing for adjusting the frequency band used by the second base station apparatus 103b. The second frequency band adjusting apparatus 105b may include the band adjusting unit 121 depicted in FIG. 18. The first frequency band adjusting apparatus 105a and the second frequency band adjusting apparatus 105b may be separate and independent apparatuses, or may be one integrated apparatus.

In accordance with the present embodiment, by providing the frequency band adjusting apparatus as an apparatus separate from the base station apparatus, it is possible to implement the present embodiment without substantially modifying existing device construction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A frequency band adjusting method, in a first communication system and a second communication system sharing usable frequency band with each other, for adjusting the frequency band used by a first communication apparatus in said first communication system, to be executed by said first communication apparatus, comprising:
   determining necessity of increase in a first frequency band used by said first communication apparatus based on an average communication rate per access calculated from the first frequency band used by said first communication apparatus and a number of accesses to said first communication apparatus;
   determining, when there is necessity of increase in the first frequency band used by said first communication apparatus, whether or not an increase in the first frequency band used by said first communication apparatus is to be approved, according to whether there is an unused frequency band not used by a second communication apparatus in said second communication system having coverage overlapping with said first communication apparatus; and
   increasing the first frequency band used by said first communication apparatus, when it is determined that an increase in the first frequency band used by said first communication apparatus is to be approved.

2. The frequency band adjusting method according to claim 1, wherein, when it is determined that there is the necessity of increase in the first frequency band used by said first communication apparatus, and a priority of said first communication system is higher than a priority of said second communication system, the first frequency band used by said first communication apparatus is increased.

3. The frequency band adjusting method according to claim 1, further comprising:
   determining whether or not a decrease in a second frequency band used by said second communication apparatus is to be permitted, based on the second frequency band used by said second communication apparatus and the number of access to said second communication apparatus, and
   decreasing the second frequency band used by said second communication apparatus if when a decrease in the second frequency band used by said second communication apparatus is permitted.

4. The frequency band adjusting method according to claim 3, wherein it is determined whether or not an increase in the first frequency band used by said first communication apparatus is to be approved according as there is or there is not an unused frequency band produced by decrease of the second frequency band used by said second communication apparatus.

5. The method according to claim 1, wherein, when the first frequency band used by said first communication apparatus is increased by adding a third frequency band to the first frequency band, some access which has been accommodated in the first frequency band before the increase is handed over to the third frequency band.

6. The method according to claim 3, wherein, the second frequency band used by said second communication apparatus is decreased by removing a fourth frequency band from the second frequency band, the access which has been accommodated in the fourth frequency band is handed over to the second frequency band that continues to be used by said second communication apparatus after the decrease in the frequency band.

7. A communication apparatus which is, in a first communication system and a second communication system sharing usable frequency band with each other, a first communication apparatus in said first communication system, comprising:
   a band increase necessity determining unit that determines necessity of increase in a first frequency band used by said first communication apparatus based on an average communication rate per access calculated from the first frequency band used by said first communication apparatus and a number of accesses to said first communication apparatus;
   a band increase request transmission unit that transmits a request signal requesting increase of the first frequency band used by said first communication apparatus to a second communication apparatus in said second communication system having coverage overlapping with said first communication apparatus, when it is determined in the determination by said band increase necessity determining unit that there is necessity of increase in the first frequency band used by said first communication apparatus; and
   a band increasing unit that increases the first frequency band used by said first communication apparatus when an approval signal in response to said request signal is received from said second communication apparatus.

8. The communication apparatus according to claim 7, further comprising:
   an inter-band handover unit that, when the first frequency band used by the first communication apparatus is increased by adding a third frequency band to the first frequency band, hands over some of the access which has been accommodated in the first frequency band before the increase to the third frequency band.

9. A communication apparatus which is, in a first communication system and a second communication system sharing usable frequency band with each other, a second communication apparatus in said second communication system, comprising:
   a band increase request receiving unit that receives, from a first communication apparatus in said first communication system having coverage overlapping with said second communication apparatus, a request signal requesting increase in a first frequency band used by said first communication apparatus according to necessity of the increase in the first frequency band used by said first communication apparatus, the necessity of the increase being determined based on an average communication rate per access calculated from the first frequency band used by said first communication apparatus and a number of accesses to said first communication apparatus;
   a band increase approval determining unit that determines whether or not increase in the first frequency band used by said first communication apparatus is to be approved, according to whether there is an unused frequency band not used by the second communication apparatus; and
   an approval signal transmission unit that transmits, when, in the determination by said band increase approval determining unit, it is determined that increase in the first frequency band used by said first communication apparatus is to be approved, an approval signal approving increase in the first frequency band used by said first communication apparatus.

10. The communication apparatus according to claim 9, wherein, when a priority of said first communication system is higher than a priority of said second communication system, said band increase approval determining unit approves increase in the first frequency used by said first communication apparatus.

11. The communication apparatus according to claim 9, further comprising:
 a band decrease permission determining unit that determines whether or not decrease in a second frequency band used by said second communication apparatus is to be permitted, based on the second frequency band used by said second communication apparatus and the number of access to said second communication apparatus; and
 a band decreasing unit that decreases the second frequency band used by said second communication apparatus, when it is determined, in said determination by said band decrease permission determining unit, that decrease in the second frequency used by said second communication apparatus is to be permitted.

12. The communication apparatus according to claim 11, wherein said band increase approval determining unit determines whether or not increase in the first frequency band used by said first communication apparatus is to be approved, according as there is or there is not an unused frequency band produced by the decrease in the second frequency band used by said second communication apparatus.

13. The communication apparatus according to claim 11, further comprising:
 an inter-band handover unit that, when the second frequency band used by said second communication apparatus is decreased by removing a fourth frequency band from the second frequency band, hands over the access accommodated in the fourth frequency band to the second frequency band which continues to be used by said second communication apparatus after the decrease in the second frequency band.

14. A frequency band adjusting apparatus which is, in a first communication system and a second communication system sharing usable frequency band with each other, a first frequency band adjusting apparatus for adjusting a first frequency band used by a first communication apparatus in said first communication system, comprising:
 a band increase necessity determining unit that determines necessity of increase in the first frequency band used by said first communication apparatus based on an average communication rate per access calculated from the first frequency band used by said first communication apparatus and a number of accesses to said first communication apparatus;
 a band increase request transmission unit that transmits a request signal requesting increase of the first frequency band used by said first communication apparatus to a second frequency band adjusting apparatus for adjusting a second frequency band used by a second communication apparatus in said second communication system having coverage overlapping with said first communication apparatus, when it is determined in the determination by said band increase necessity determining unit that there is necessity in increase of the first frequency band used by said first communication apparatus; and
 an increase instructing unit that instructs increase in the first frequency band used to said first communication apparatus, when an approval signal is received from said second frequency band adjusting apparatus in response to said request signal.

15. A frequency band adjusting apparatus which is, in a first communication system and a second communication system sharing usable frequency band with each other, a second frequency band adjusting apparatus for adjusting a second frequency band used by a second communication apparatus in said second communication system, comprising:
 a band increase request receiving unit that receives a request signal, from a first frequency band adjusting apparatus which adjusts a first frequency band used by a first communication apparatus in said first communication system having coverage overlapping with said second communication apparatus, requesting increase in the first frequency band used in said first communication apparatus according to necessity of the increase in the first frequency band used by said first communication apparatus, the necessity of the increase being determined based on an average communication rate per access calculated from the first frequency band used by said first communication apparatus and a number of accesses to said first communication apparatus;
 a band increase approval determining unit that determines whether or not increase in the first frequency band used by said first communication apparatus is to be approved according to whether there is an unused frequency band not used by said second communication apparatus;
 an approval signal transmission unit that transmits an approval signal approving the increase in the first frequency band used by said first communication apparatus, when it is determined, in the determination by said band increase approval determining unit, that increase in the first frequency band used by said first communication apparatus is to be approved.

* * * * *